(12) United States Patent
Kobiki et al.

(10) Patent No.: US 9,794,450 B2
(45) Date of Patent: Oct. 17, 2017

(54) IMAGE PROCESSOR, IMAGE DISPLAY DEVICE, AND IMAGE PROCESSING METHOD FOR CORRECTING INPUT IMAGE

(71) Applicant: KABUSHIKI KAISHA TOSHIBA, Tokyo (JP)

(72) Inventors: Hisashi Kobiki, Kanagawa (JP); Mikiko Karasawa, Tokyo (JP); Yasutoyo Takeyama, Kanagawa (JP); Masahiro Baba, Kanagawa (JP); Nao Mishima, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 14/944,612

(22) Filed: Nov. 18, 2015

(65) Prior Publication Data
US 2016/0142588 A1 May 19, 2016

(30) Foreign Application Priority Data

Nov. 19, 2014 (JP) .................................. 2014-234227
Aug. 17, 2015 (JP) .................................. 2015-160633

(51) Int. Cl.
| | |
|---|---|
| G06K 9/00 | (2006.01) |
| H04N 1/60 | (2006.01) |
| H04N 9/31 | (2006.01) |
| H04N 9/67 | (2006.01) |

(52) U.S. Cl.
CPC ......... *H04N 1/6027* (2013.01); *H04N 9/3182* (2013.01); *H04N 9/3194* (2013.01); *H04N 9/67* (2013.01)

(58) Field of Classification Search
CPC ............... H04N 9/3182; H04N 9/3173; H04N 13/0459; H04N 13/0422; H04N 2201/0089; H04N 1/60; G06T 5/001
See application file for complete search history.

(56) References Cited

U.S. PATENT DOCUMENTS

| | | | |
|---|---|---|---|
| 2004/0021672 A1* | 2/2004 | Wada | G09G 3/002 |
| | | | 345/591 |
| 2007/0091337 A1* | 4/2007 | Morovic | H04N 1/6058 |
| | | | 358/1.9 |
| 2014/0184662 A1 | 7/2014 | Kobiki et al. | |
| 2015/0085162 A1* | 3/2015 | Huang | H04N 9/3182 |
| | | | 348/234 |

FOREIGN PATENT DOCUMENTS

| | | |
|---|---|---|
| JP | 2012-233979 | 11/2012 |
| JP | 2014-126782 | 7/2014 |

* cited by examiner

*Primary Examiner* — Eueng-Nan Yeh
(74) *Attorney, Agent, or Firm* — Nixon & Vanderhye, P.C.

(57) ABSTRACT

According to one embodiment, an image processor includes a processor. The processor implements acquiring a first image and first information. The first information indicates a condition of a first projection surface. The first information includes a first color gamut of the first projection surface. The processor implements deriving a second color gamut according to the first color gamut derived by using the first information. The processor implements converting a chromaticity of the first image to obtain a second image. Each pixel of the second image has a color included in the second color gamut. The processor implements generating a first converted image by correcting the second image based on the first color gamut.

15 Claims, 14 Drawing Sheets

IMAGE PROCESSOR, IMAGE DISPLAY DEVICE, AND IMAGE PROCESSING METHOD FOR CORRECTING INPUT IMAGE

CROSS-REFERENCE TO RELATED APPLICATIONS

This application is based upon and claims the benefit of priority from Japanese Patent Applications No. 2014-234227, filed on Nov. 19, 2014 and No. 2015-160633, filed on Aug. 17, 2015; the entire contents of which are incorporated herein by reference.

FIELD

Embodiments described herein relate generally to an image processor, an image display device, and an image processing method.

BACKGROUND

There is technology in which an image display device such as a projector device or the like is used to project an image onto a projection surface such as a screen, a wall, a floor, etc. The projection surface has various colors. Therefore, when the input image is projected onto the projection surface as-is, the color of the projected image may be different from the color of the input image. There is technology that corrects the input image to reduce such a difference. In such an image processor, it is desirable to project an image having higher quality.

DETAILED DESCRIPTION

Figure 1:
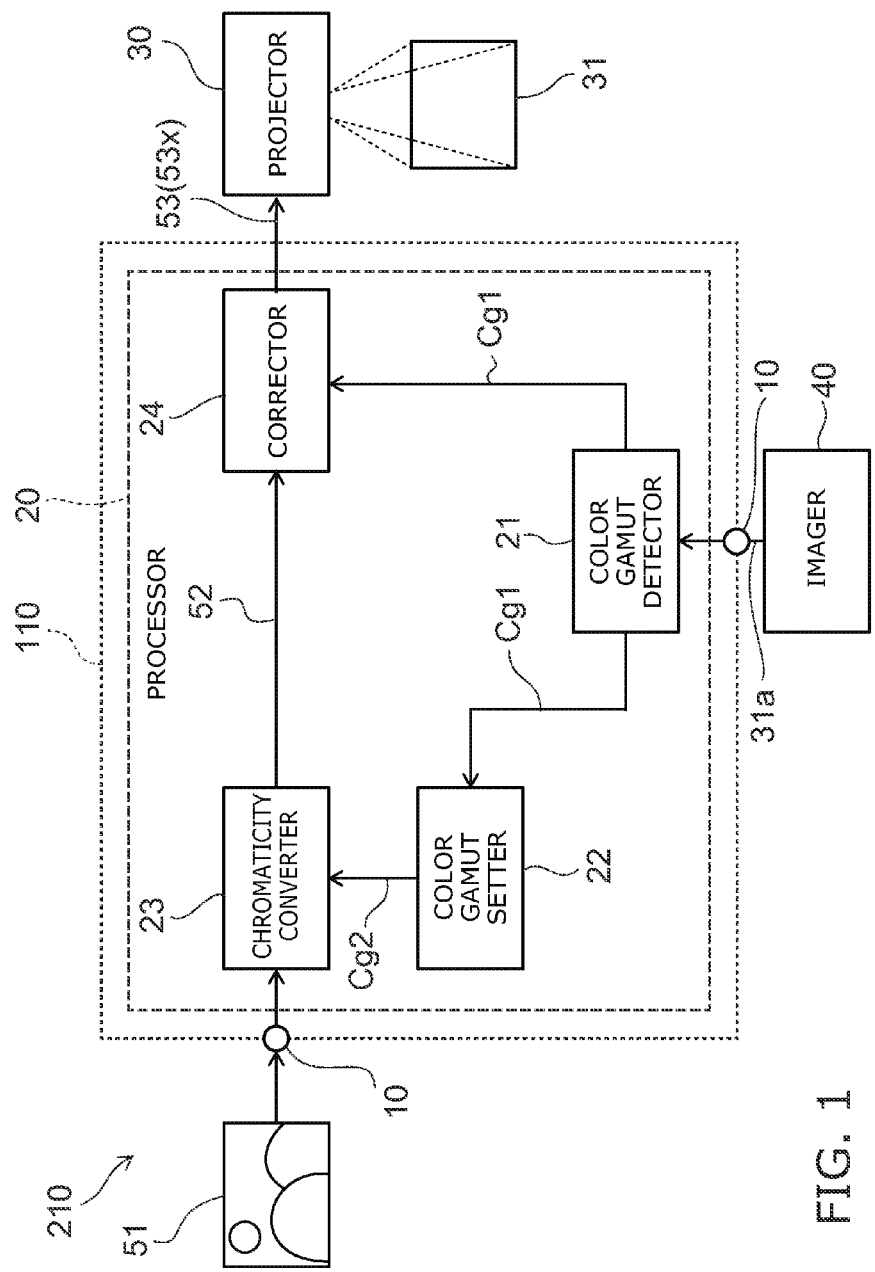
FIG. 1 is a block diagram showing an image processor and an image display device according to the first embodiment.

According to one embodiment, an image processor includes a processor. The processor implements acquiring a first image and first information. The first information indicates a condition of a first projection surface. The first information includes a first color gamut of the first projection surface. The processor implements deriving a second color gamut according to the first color gamut derived by using the first information. The processor implements converting a chromaticity of the first image to obtain a second image. Each pixel of the second image has a color included in the second color gamut. The processor implements generating a first converted image by correcting the second image based on the first color gamut.

Various Embodiments of the invention will be described hereinafter with reference to the accompanying drawings.

The drawings are schematic or conceptual; and the relationships between the thicknesses and widths of portions, the proportions of sizes between portions, etc., are not necessarily the same as the actual values thereof. The dimensions and/or the proportions may be illustrated differently between the drawings, even in the case where the same portion is illustrated.

In the drawings and the specification of the application, components similar to those described in regard to a drawing thereinabove are marked with like reference numerals, and a detailed description is omitted as appropriate.

First Embodiment

FIG. 1 is a block diagram showing an image processor and an image display device according to the first embodiment.

The image processor 110 of the embodiment includes an inputter 10 and a processor 20. The inputter 10 includes, for example, input/output terminals. The inputter 10 includes an input/output interface that communicates with the outside via a wired or wireless method. The processor 20 includes, for example, a calculating device including a CPU (Central Processing Unit), memory, etc. A portion of each block or each entire block of the processor 20 may include an integrated circuit such as LSI (Large Scale Integration), etc., or an IC (Integrated Circuit) chipset. Each block may include an individual circuit; or a circuit in which some or all of the blocks are integrated may be used. The blocks may be provided as one body; or some blocks may be provided separately. Also, for each block, a portion of the block may be provided separately. The integration is not limited to LSI; and a dedicated circuit or a general-purpose processor may be used.

A color gamut detector 21, a color gamut setter 22, a chromaticity converter 23, and a corrector 24 are provided in the processor 20. For example, these components are realized as an image processing program. In other words, the image processor 110 also may be realized by using a general-purpose computer device as the basic hardware. The functions of each component included in the image processor 110 may be realized by causing a processor mounted in the computer device recited above to execute the image processing program. In such a case, the image processor 110 may be realized by preinstalling the image processing program recited above in the computer device; or the image processor 110 may be realized by storing the image processing program recited above in a storage medium such as CD-ROM, etc., or distributing the image processing program recited above via a network and appropriately installing the image processing program in the computer device. The processor 20 also may be realized by appropriately utilizing a storage medium such as memory, a hard disk, CD-R, CD-RW, DVD-RAM, DVD-R, etc., connected externally or built into the computer device recited above.

The image display device 210 includes the image processor 110, a projector 30, and an imager 40. The image display device 210 displays an image on a projection surface (a surface existing in real space) outside the image display device 210 by projecting the image. Here, the projection surface is not limited to a general projection screen. The projection surface includes, for example, various surfaces having patterns and colors such as indoor and outdoor wall surfaces, floors, ceilings, etc.

A first image 51 is input to the inputter 10. Various formats of the input image signal are possible. In the embodiment, each pixel includes luminances of the three channels of a red component, a green component, and a blue component as pixel values. The luminance of each channel at a position (u, v) inside the image is expressed by a luminance value I(u, v). In such a case, the signal of each channel may be calculated by a linear transformation from a nonlinear gradation value. For example, the signal may be calculated from an input image signal of the YCbCr transmission standard of the International Telecommunication Union, etc.

The first image 51 may be an image signal input from all sorts of devices or media. For example, the first image 51 may be an image signal input from a recording medium such as a HDD (Hard Disk Drive), etc. The first image 51 may be an image signal input from an external device connected via a network. The first image 51 may be an image signal input from a broadcast wave such as TV, etc.

For example, any general projection device such as a liquid crystal projector, a laser projector, etc., may be used as the projector 30. The projector 30 may be connected to the image processor 110 as an independent external device.

For example, a visible light camera is used as the imager 40. The imager 40 acquires an acquired image including at least a portion of a first projection surface 31. A first converted image 53x of the converted first image 51 of the input is projected onto the first projection surface 31. Here, the acquired image refers to the projected image that is imaged when an image (e.g., the first image 51) is output from the projector 30 and projected onto the first projection surface 31. The imager 40 may be connected to the image processor 110 as an independent external device.

First information 31a relating to the first projection surface is input to the inputter 10. The first information 31a is, for example, an acquired image including at least a portion of the first projection surface 31 acquired by the imager 40. In other words, the first information 31a is input from the imager 40 to the inputter 10.

The color gamut detector 21 implements first color gamut detection processing. In the first color gamut detection processing, a first color gamut Cg1 of the first projection surface 31 is detected based on the first information 31a.

The color gamut setter 22 implements first color gamut setting processing. In the first color gamut setting processing, a second color gamut Cg2 that is different from the first color gamut Cg1 is set according to the first color gamut Cg1.

The chromaticity converter 23 implements first chromaticity conversion processing. In the first chromaticity conversion processing, a second image 52 in which the chromaticity of the first image 51 is converted is derived. The second image 52 includes colors included inside the second color gamut Cg2.

The corrector 24 implements first correction processing. In the first correction processing, a third image 53 of the second image 52 corrected based on the first color gamut Cg1 is derived. The third image 53 corresponds to the first converted image 53x of the converted first image 51 recited above. The third image 53 reproduces the second image 52 on the first projection surface 31. The third image 53 is projected onto the first projection surface 31 by the projector 30. The second image 52 is reproduced by the third image 53 being projected onto the first projection surface 31.

There is a reference example in which the input image is corrected using the color of the projection surface and the color of a predetermined reference projection surface. According to the reference example, the color of the projection surface is detected. The color on the reference projection surface is used as a target color. The color of the input image is corrected so that the color on the projection surface approaches the target color.

The color gamut of one reference projection surface is predetermined in the reference example. Therefore, in the case where the difference between the color gamut of the projection surface and the color gamut of the reference projection surface is large, there may be colors that cannot be reproduced in the projection surface. Therefore, there is a possibility that color skipping and color collapse of the corrected image (the projected image) may occur.

On the other hand, in the embodiment, the second color gamut Cg2 that is different from the first color gamut Cg1 is set according to the first color gamut Cg1 of the first projection surface 31. Specifically, the second color gamut Cg2 includes a first region and a second region, such that the first color gamut Cg1 and the first region do not overlap, and the first color gamut Cg1 and the second region overlap. The second color gamut Cg2 is set so that the surface area of the first region is less than the surface area of the second region (referring to FIG. 4 described below). Thereby, the difference between the first color gamut Cg1 and the second color gamut Cg2 can be set to be small. The second image 52 of the first image 51 having the converted chromaticity is generated using the second color gamut Cg2 as the target color gamut. That is, the second image 52 is an image in which the color of the first image 51 is converted to be within the second color gamut Cg2. The third image 53 of the corrected second image 52 is generated. The second image 52 is reproduced on the first projection surface 31 by projecting the third image 53 onto the first projection surface 31.

According to the embodiment, the second color gamut Cg2 that is used as the target color gamut is set adaptively according to the first color gamut Cg1 of the first projection surface 31. The second image 52 is formed by performing chromaticity conversion of the color of the first image 51 which is the input image so that the color is within the second color gamut Cg2. The second image 52 is the target image. The third image 53 of the corrected second image 52 is generated. The third image 53 reproduces the second image 52 when projected onto the first projection surface 31. The third image 53 is a corrected image. Thereby, the color skipping and color collapse of the corrected image (the projected image) can be suppressed. Thereby, a high-quality projected image can be provided.

Figure 2:
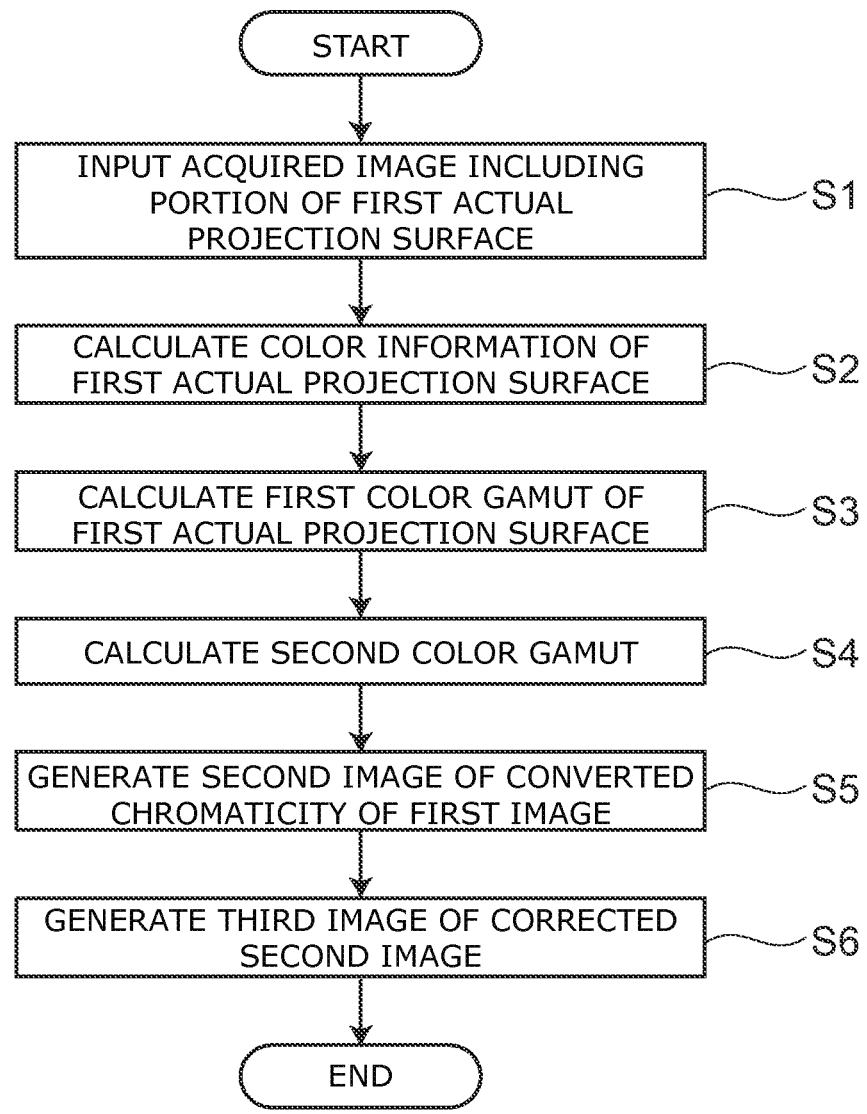
FIG. 2 is a flowchart showing an image processing method according to the first embodiment.

FIG. 2 is a flowchart showing an image processing method according to the first embodiment.

The color gamut detector 21 inputs the acquired image (the first information 31a) including at least a portion of the first projection surface 31 by using the imager 40 (e.g., the visible light camera) (step S1).

Here, the acquired image is, for example, the image that is output from the projector 30, projected, and imaged. The brightness and color of the projection image output from the projector 30 change due to the effects of the material, shape, etc., of the first projection surface 31. Therefore, the material, shape, etc., of the first projection surface 31 can be estimated by the color gamut detector 21 by the image projected from the projector 30 being imaged using the imager 40. It is desirable for the imager 40 to be in a calibrated state in which parameters such as the aperture stop, the shutter speed, etc., are known beforehand. The imager 40 may not be calibrated.

The color gamut detector 21 calculates (step S2) the color information of the first projection surface 31 using the acquired image input in step S1. The color gamut detector 21 uses the color information of the first projection surface 31 to calculate the first color gamut Cg1 of the first projection surface 31 and outputs the calculated first color gamut Cg1 to the color gamut setter 22 and the corrector 24 (step S3).

The color information of the first projection surface 31 is calculated using the color information of the acquired image. Here, the color information of the first projection surface 31 is expressed by a component RB (hereinbelow, called the offset RB) of the reflected light produced by reflecting indoor illumination light, etc., and by a reflectance RW which is the intensity of the reflected light from the projector 30. For example, the offset RB and the reflectance RW can be calculated by comparing the color information of the acquired image to the color information when a predetermined reference projection surface is imaged. The offset RB and the reflectance RW may be calculated by detecting the region in the acquired image of the projection image generated by the projection light output from the projector 30 and by comparing the acquired image to the projection image when projected onto the predetermined reference projection surface. The offset RB and the reflectance RW may be calculated by multiply repeating the projecting, the imaging, and the analysis.

Continuing in step S3, the first color gamut Cg1 of the first projection surface 31 is calculated using the color information of the first projection surface 31. The first color gamut Cg1 of the first projection surface 31 is the information of the range of representable colors when the projection light from the projector 30 is projected onto the first projection surface 31. The color space that defines the representable colors is the space of three-dimensional information of attributes such as the brightness (the lightness), the vividness (the color saturation), and the hue. The color space may be any space. As an example in the embodiment hereinbelow, the color is represented in the CIE XYZ color space, and the Yxy color space into which the colorimetric system of the CIE XYZ color space is modified. Color spaces such as RGB, CIE LUV, CIE LAB, CIE LCH, CIECAM02, etc., may be used in the embodiment.

In the XYZ color space, the color of the light reflected by the projection surface is represented by the XYZ value which is the three values of X (the red component), Y (the green component), and Z (the blue component). The Yxy color space is derived by the following formula using the XYZ value inside the XYZ space.

$$Y=Y$$
$$x=X/(X+Y+Z)$$
$$y=Y/(X+Y+Z) \quad (1)$$

In other words, the Yxy color space is a color space in which the XYZ value is expressed by the Y value which is the luminance, and the x and y values (hereinbelow, called the xy chromaticity) which is the relative intensity of the X-component and the Y-component.

In step S2 according to the embodiment, the representable colors on the first projection surface 31 of interest are calculated by the following formula.

$$C=IN \cdot RW+RB \quad (2)$$

Here, C is the XYZ value on the first projection surface 31; IN is the XYZ value of the reflected light when the first image 51 is projected onto the reference projection surface; RW is the reflectance at the first projection surface 31; and RB is the offset at the first projection surface 31. In such a case, it is desirable to use a preset conversion function to convert the gradation value of the first image 51 into IN which is the XYZ value of the reflected light when the first image 51 is projected onto the reference projection surface.

The first color gamut Cg1 of the first projection surface 31 is the information of the range of representable colors when the projection light from the projector 30 is projected onto the first projection surface 31. Therefore, it is possible to calculate the first color gamut Cg1 of the first projection surface 31 by calculating C using Formula (2) for IN of each color existing in the first image 51. C may be calculated as the first color gamut Cg1 of the first projection surface 31 for multiple representative colors including at least three colors of the multiple colors existing in the first image 51. As an example in the embodiment, the case is assumed where the representative colors of IN are red (RED), green (GREEN), blue (BLUE), white (WHITE), and black (BLACK).

Figures 3A, 3B:
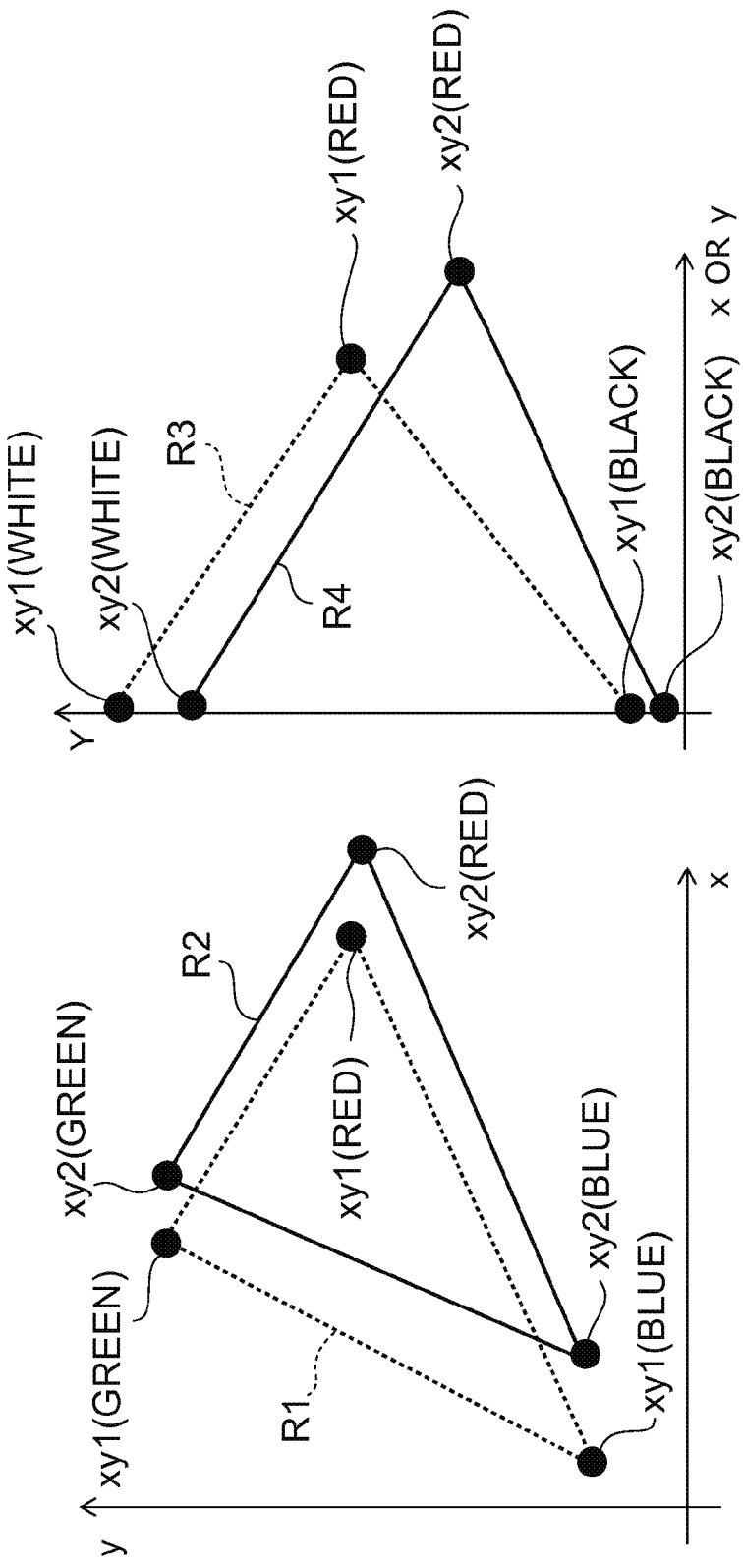
FIG. 3A and FIG. 3B are graphs of the color gamut of the image processor and the image display device according to the first embodiment.

FIG. 3A and FIG. 3B are graphs of the color gamut of the image processor and the image display device according to the first embodiment.

FIG. 3A is a graph in which the xy chromaticity is plotted for the results of using IN of red, green, blue, white, and black as the representative colors, calculating C which is the XYZ value of each using Formula (2), and converting to the Yxy value using Formula (1). The vertical axis is the y value; and the horizontal axis is the x value.

xy1(RED), xy1(BLUE), and xy1(GREEN) are the chromaticities of red, blue, and green in the case where the color information of the first projection surface 31 is a reflectance RW1 and an offset RB1. Similarly, xy2(RED), xy2(BLUE), and xy2(GREEN) are the chromaticities of red, blue, and green in the case where the color information of the first projection surface 31 is a reflectance RW2 and an offset RB2.

In such a case, a triangular color gamut R1 that is formed of xy1(RED), xy1(BLUE), and xy1(GREEN) is the color gamut in the xy chromaticity directions in the case where the color information of the first projection surface 31 is the reflectance RW1 and the offset RB1. Similarly, a triangular color gamut R2 that is formed of xy2(RED), xy2(BLUE), and xy2(GREEN) is the color gamut in the xy chromaticity directions in the case where the color information of the first projection surface 31 is the reflectance RW2 and the offset RB2. The reflectance RW2 is different from the reflectance RW1; and the offset RB2 is different from the offset RB1. Thus, the color gamut in the xy chromaticity directions can be calculated according to step S2.

The color gamuts R1 and R2 are the information of the range of representable colors when the projection light from the projector 30 is projected onto the first projection surface 31 of interest. Therefore, in principle, colors outside the triangles cannot be reproduced. In other words, it is possible to reproduce the target color on the first projection surface 31 of interest by converting the chromaticity of the target color to be inside the color gamut calculated in step S2.

FIG. 3B is a graph in which IN of red, green, blue, white, and black is used as the representative colors; C which is the XYZ value of each is calculated using Formula (2); and the results of converting into the Yxy value using Formula (1) are plotted on the Y-x (or y) axes. The vertical axis is the Y value; and the horizontal axis is the x value (or the y value).

xy1(WHITE), xy1(RED), and xy1(BLACK) are the chromaticities of white, red, and black in the case where the color information of the first projection surface 31 is the reflectance RW1 and the offset RB1. Similarly, xy2(WHITE), xy2(RED), and xy2(BLACK) are the chromaticities of white, red, and black in the case where the color information of the first projection surface 31 is the reflectance RW2 and the offset RB2. The reflectance RW2 is different from the reflectance RW1; and the offset RB2 is different from the offset RB1.

In such a case, a triangular color gamut R3 that is formed of xy1(WHITE), xy1(RED), and xy1(BLACK) is the color gamut in the luminance (Y)-chromaticity (x or y) directions in the case where the color information of the first projection surface 31 is the reflectance RW1 and the offset RB1. Similarly, a triangular color gamut R4 that is formed of xy2(WHITE), xy2(RED), and xy2(BLACK) is the color gamut in the luminance (Y)-chromaticity (x or y) directions in the case where the color information of the first projection surface 31 is the reflectance RW2 and the offset RB2. Thus, the color gamut in the luminance (Y)-chromaticity (x or y) directions can be calculated according to step S2.

The color gamuts R3 and R4 are the information of the range of representable colors when the projection light from the projector 30 is projected onto the first projection surface 31 of interest. Therefore, in principle, colors outside the triangles cannot be reproduced. In other words, it is possible to reproduce the luminance of the target color on the first projection surface 31 of interest by converting the target color to be inside the color gamut calculated in step S2.

Thus, according to steps S2 to S3 according to the embodiment, it is possible to calculate the color gamut in the xy chromaticity directions and the color gamut in the chromaticity (x or y)-luminance (Y) directions as the first color gamut Cg1 of the first projection surface 31. Thereby, it is possible to set the target color gamut in the color gamut setter 22 of the subsequent stage.

The color gamut setter 22 calculates the second color gamut Cg2 that is different from the first color gamut Cg1 according to the first color gamut Cg1 of the first projection surface 31 and outputs the second color gamut Cg2 to the chromaticity converter 23 (step S4). The second color gamut Cg2 is the target color gamut.

Figure 4:
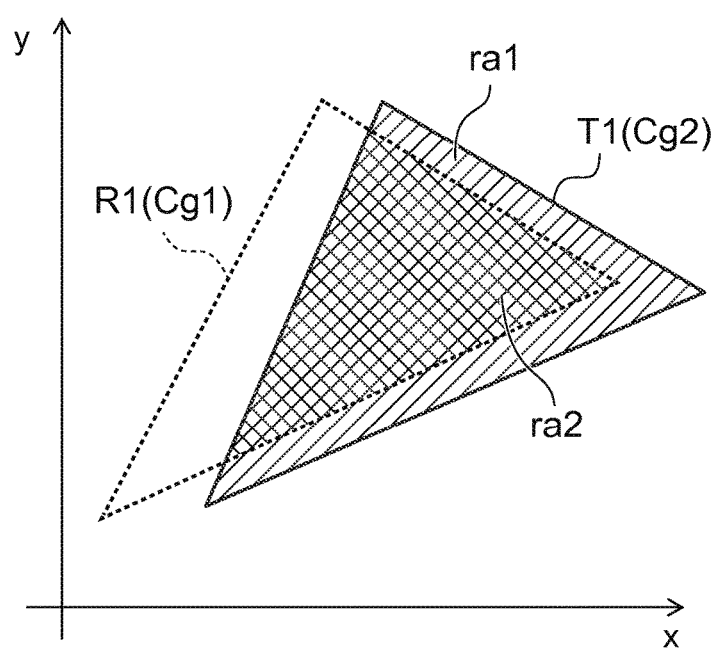
FIG. 4 is a graph of the processing of the color gamut setter according to the first embodiment.

FIG. 4 is a graph of the processing of the color gamut setter 22 according to the first embodiment.

The vertical axis is the y value; and the horizontal axis is the x value. For example, the case is assumed where the first color gamut Cg1 of the first projection surface 31 input from the color gamut detector 21 is the actual color gamut R1. In such a case, the color of the actual color gamut R1 is reproduced on the first projection surface 31 of interest. Conversely, the second color gamut Cg2 is set as in a target color gamut T1. Thereby, it is possible to correct the projection image to reproduce the color of the target color gamut T1 on the first projection surface 31 of interest. Specifically, the target color gamut T1 (the second color gamut Cg2) includes a first region ra1 and a second region ra2, where the actual color gamut R1 (the first color gamut Cg1) and the first region ra1 do not overlap, and the actual color gamut R1 and the second region ra2 overlap. The target color gamut T1 is set so that the surface area of the first region ra1 is less than the surface area of the second region ra2. Thereby, the difference between the actual color gamut R1 and the target color gamut T1 can be set to be small.

The actual color gamut R1 and the target color gamut T1 may be reversed. That is, in the case where the first color gamut Cg1 of the first projection surface 31 is the actual color gamut T1, the second color gamut Cg2 may be set as in the target color gamut R1. Thereby, it is possible to correct the projection image to reproduce the color of the target color gamut R1 on the first projection surface 31 of interest.

To adaptively set such a target color gamut, a reflectance TW of the projection surface for the target color gamut T1 and an offset TB of the projection surface for the target color gamut T1 are set in step S4 according to the embodiment. At this time, it is desirable for the reflectance TW and the offset TB to be set according to the actual color gamut R1 (the first color gamut Cg1) of the first projection surface 31. The reflectance TW and the offset TB may be predetermined.

Thus, according to step S4, the target color gamut is set to reproduce any target color on the projection surface even for various colors of the projection surface and various color gamuts of the projection surface.

The chromaticity converter 23 generates the second image 52 of the first image 51 having the converted chromaticity and outputs the second image 52 to the corrector 24 (step S5). In other words, the second image 52 includes colors within the second color gamut Cg2. A color T of the second image 52 can be calculated by the following formula.

$$T = IN \cdot TW + TB \quad (3)$$

Here, IN is the XYZ value of the reflected light when the first image 51 is projected onto the reference projection surface; TW is the reflectance of the projection surface for the target color gamut T1; and TB is the offset of the projection surface for the target color gamut T1. In step S5, the reflectance TW and the offset TB are used as the information of the target color gamut T1. The color of the second image 52 includes the color of the first image 51 subjected to chromaticity conversion to be within the second color gamut Cg2. The second image 52 can be used as the target image.

The corrector 24 generates the third image 53 of the corrected second image 52 based on the first color gamut Cg1 of the first projection surface 31 and outputs the third image 53 to the projector 30 (step S6). At this time, a color O of the third image 53 of the corrected second image 52 can be calculated by the following formula.

$$O = (T - RB)/RW \quad (4)$$

Here, T is the color of the second image 52 calculated by the chromaticity converter 23; RB is the color (the offset) of the reflected light produced by the first projection surface 31 reflecting indoor illumination light, etc.; and RW is the reflectance which is the intensity of the light from the projector 30 reflected by the first projection surface 31. In other words, in Formula (4), to reproduce the color T of the second image 52 on the first projection surface 31, it is possible to pre-correct the projection image so that the change of the color due to the offset RB and the reflectance RW is canceled. By using the corrected image (the third image 53) that is corrected, the third image 53 that is output from the projector 30 of the subsequent stage is reflected by the first projection surface 31; and the target image (the second image 52) that includes the color T is reproduced.

According to Formula (4) recited above, a third color is calculated based on the difference between a first color of the second image 52 and a second color of the first projection surface 31. For example, the third color may be used as the color of the third image 53 as-is. Or, a fourth color of the third image 53 may be determined so that a color difference ΔEab between the third color and the fourth color is 6.0 or less. If the color difference between the third color and the fourth color is zero, the third color and the fourth color are equal. For example, it is sufficient to calculate the color difference using a general color difference formula (e.g., the CIE 1976 L*a*b* color difference formula, etc.) that calculates the color difference on a chromaticity diagram. ΔEab is the color difference between two colors defined by ΔL*, Δa*, and Δb* which are the differences of the coordinates L*, a*, and b* of the L*a*b* colorimetric system. Thus, the third color and the fourth color may not always match. From the perspective of the color reproducibility of the second image 52, it is more desirable for the third color and the fourth color to match.

Thus, according to the embodiment, it is possible to set the target color gamut to reproduce any target color on the projection surface even for various colors of the projection surface and various color gamuts of the projection surface. Therefore, it is possible to correct the projection image to reproduce the target color on the projection surface of interest.

According to the embodiment, the second color gamut Cg2 that is used as the target color gamut is set adaptively according to the first color gamut Cg1 of the first projection surface 31. The second image 52 is formed by performing chromaticity conversion of the color of the first image 51 which is the input image so that the color is within the second color gamut Cg2. The second image 52 is the target image. The third image 53 of the corrected second image 52 is generated. The third image 53 reproduces the second image 52 when projected onto the first projection surface 31. The third image 53 is the corrected image. Thereby, the color skipping and color collapse of the corrected image (the projected image) can be suppressed. A high-quality projected image can be provided.

Second Embodiment

Figure 5:
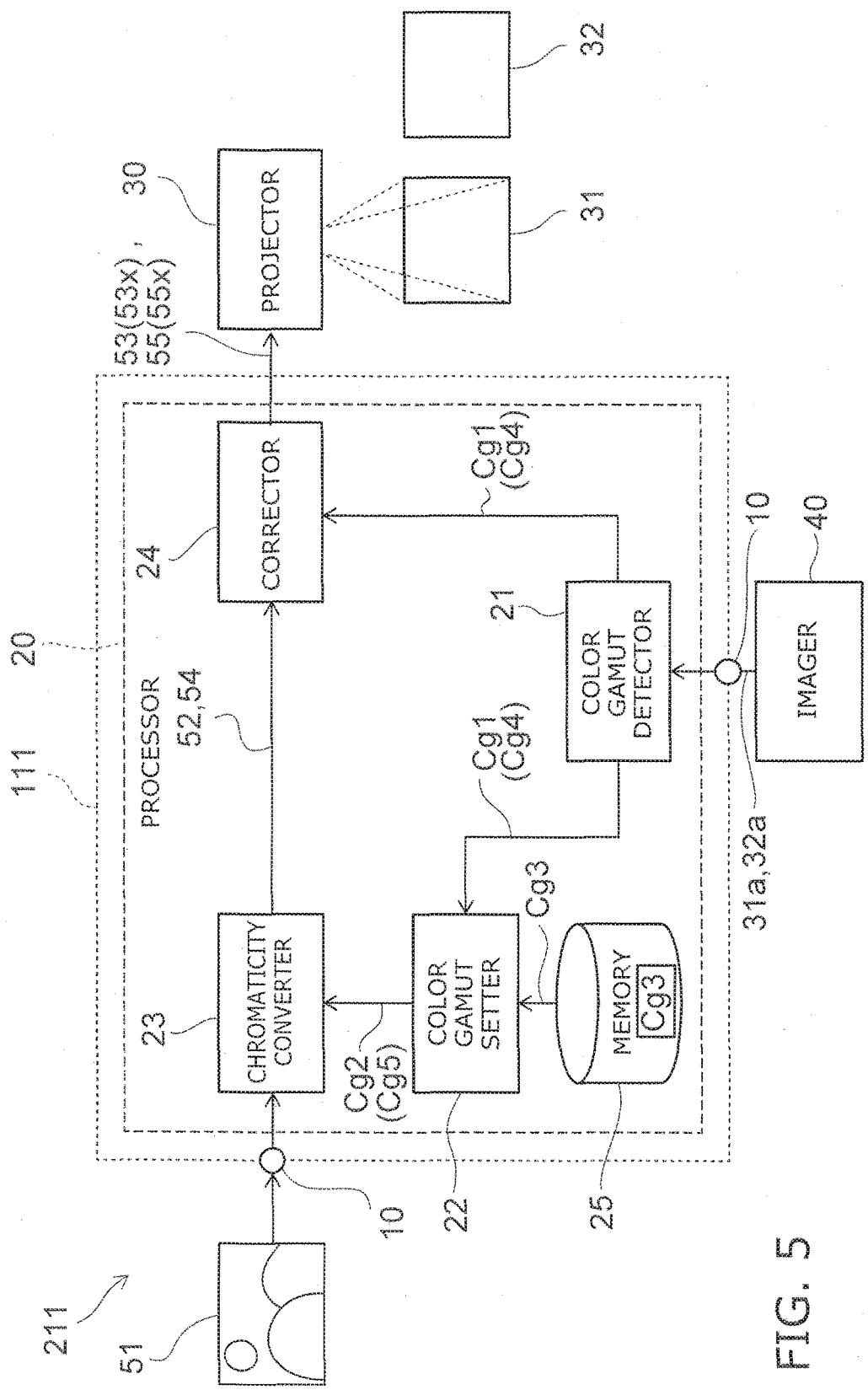
FIG. 5 is a block diagram showing an image processor and an image display device according to the second embodiment.

FIG. 5 is a block diagram showing an image processor and an image display device according to the second embodiment.

The image processor 111 of the embodiment includes the processor 20. The color gamut detector 21, the color gamut setter 22, the chromaticity converter 23, and the corrector 24 are provided in the processor 20; and memory 25 is further provided in the processor 20. The image display device 211 includes the image processor 111, the projector 30, and the imager 40.

The memory 25 stores a third color gamut Cg3 of a reference projection surface. The memory 25 outputs the third color gamut Cg3 to the color gamut setter 22. The color gamut setter 22 sets the second color gamut Cg2 based on the first color gamut Cg1 and the third color gamut Cg3. The color gamut setter 22 may calculate the third color gamut Cg3 of the reference projection surface. The third color gamut Cg3 may be calculated using the color information of a predetermined reference projection surface. In such a case, it is desirable for the color information of the reference projection surface to be pre-stored in the memory 25. The color information of the reference projection surface is expressed by a component BB (an offset BB) of the reflected light produced by the reference projection surface reflecting indoor illumination light, etc., and a reflectance BW which is the intensity of the light from the projector 30 reflected by the reference projection surface. It is desirable for the offset BB and the reflectance BW to be preset when shipped from the factory. The offset BB and the reflectance BW may be set based on external input such as input by a user, etc. The offset BB and the reflectance BW may be set based on the output from the imager 40.

The third color gamut Cg3 of the reference projection surface is calculated using the color information of the reference projection surface. Here, the third color gamut Cg3 of the reference projection surface is the information of the range of representable colors when the projection light from the projector 30 is projected onto the reference projection surface. In the example, the representable colors on the reference projection surface can be calculated using the following formula.

$$BC = IN \cdot BW + BB \quad (5)$$

Here, BC is the XYZ value on the reference projection surface; IN is the XYZ value of the reflected light when the first image 51 is projected onto the reference projection surface; BW is the reflectance at the reference projection surface; and BB is the offset at the reference projection surface. In such a case, it is desirable to convert the XYZ value of the reflected light from the gradation value of the first image 51 into IN using a preset conversion function.

The third color gamut Cg3 of the reference projection surface is the information of the range of representable colors when the projection light from the projector 30 is projected onto the reference projection surface of interest. Therefore, BC is calculated using Formula (5) for IN of each color existing in the first image 51. Thereby, it is possible to calculate the third color gamut Cg3 of the reference projection surface. BC may be calculated as the third color gamut Cg3 of the reference projection surface for multiple representative colors including at least three colors of the multiple colors existing in the first image 51. As an example in the embodiment, the case is assumed where IN is the representative colors of red, green, blue, white, and black.

Figures 6A, 6B:
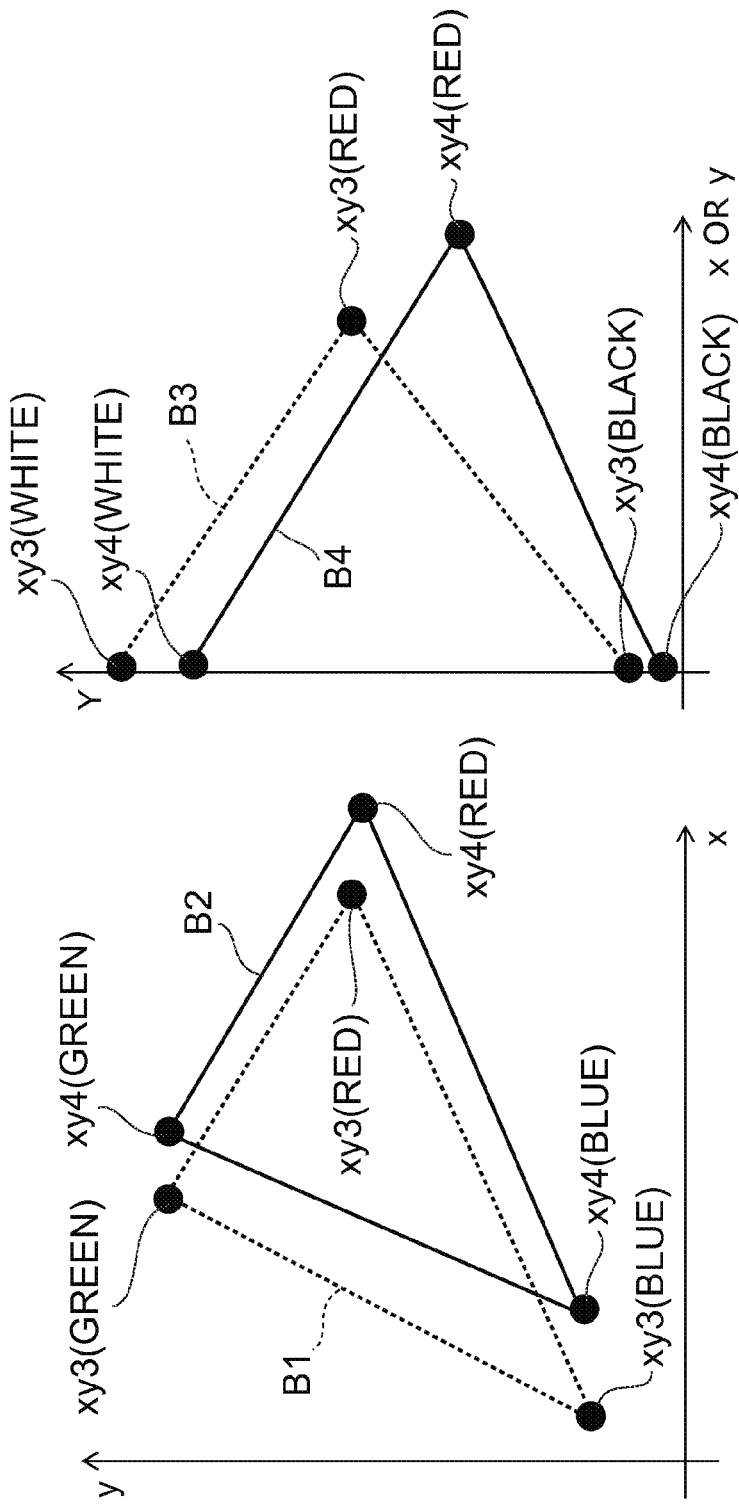
FIG. 6A and FIG. 6B are graphs of the color gamut of the image processor and the image display device according to the second embodiment.

FIG. 6A and FIG. 6B are graphs of the color gamut of the image processor and the image display device according to the second embodiment.

FIG. 6A is a graph in which IN of red, green, blue, white, and black is used as the representative colors; BC which is the XYZ value of each representative color is calculated using Formula (5); and the xy chromaticity of the results of converting into the Yxy value using Formula (1) is plotted. The vertical axis is the y value; and the horizontal axis is the x value.

xy3(RED), xy3(BLUE), and xy3(GREEN) are chromaticities of red, blue, and green in the case where the color information of the reference projection surface is a reflectance BW1 and an offset BB1. Similarly, xy4(RED), xy4(BLUE), and xy4(GREEN) are chromaticities of red, blue, and green in the case where the color information of the reference projection surface is a reflectance BW2 and an offset BB2.

In such a case, a triangular color gamut B1 that is formed of xy3(RED), xy3(BLUE), and xy3(GREEN) is the color gamut in the xy chromaticity directions in the case where the color information of the reference projection surface is the reflectance BW1 and the offset BB1. Similarly, a triangular color gamut B2 that is formed of xy4(RED), xy4(BLUE), and xy4(GREEN) is the color gamut in the xy chromaticity directions in the case where the color information of the reference projection surface is the reflectance BW2 and the offset BB2. The reflectance BW2 is different from the reflectance BW1; and the offset BB2 is different from the offset BB1. Thus, the color gamut in the xy chromaticity directions can be calculated.

The color gamuts B1 and B2 are the information of the range of representable colors when the projection light from the projector 30 is projected onto the reference projection surface of interest. Therefore, in principle, colors outside the triangles cannot be reproduced. In other words, it is possible to reproduce the target color on the reference projection surface of interest by converting the chromaticity of the target color to be inside the calculated color gamut.

FIG. 6B is a graph in which IN of red, green, blue, white, and black is used as the representative colors; BC which is the XYZ value of each representative color is calculated using Formula (5); and the results of converting into the Yxy value using Formula (1) are plotted on the Y-x (or y) axes. The vertical axis is the Y value; and the horizontal axis is the x value (or the y value).

xy3(WHITE), xy3(RED), and xy3(BLACK) are the chromaticities of white, red, and black in the case where the color information of the reference projection surface is the reflectance BW1 and the offset BB1. Similarly, xy4(WHITE), xy4(RED), and xy4(BLACK) are the chromaticities of white, red, and black in the case where the color information of the reference projection surface is the reflectance BW2 and the offset BB2. The reflectance BW2 is different from the reflectance BW1; and the offset BB2 is different from the offset BB1.

In such a case, a triangular color gamut B3 formed of xy3(WHITE), xy3(RED), and xy3(BLACK) is the color gamut in the luminance (Y)-chromaticity (x or y) directions in the case where the color information of the reference projection surface is the reflectance BW1 and the offset BB1. Similarly, a triangular color gamut B4 formed of xy4(WHITE), xy4(RED), and xy4(BLACK) is the color gamut in the luminance (Y)-chromaticity (x or y) directions in the case where the color information of the reference projection surface is the reflectance BW2 and the offset BB2. Thus, the color gamut in the luminance (Y)-chromaticity (x or y) directions can be calculated.

The color gamuts B3 and B4 are the information of the range of representable colors when the projection light from the projector 30 is projected onto the reference projection surface of interest. Therefore, in principle, colors outside the triangles cannot be reproduced. In other words, it is possible to reproduce the luminance of the target color on the reference projection surface of interest by converting the target color to be inside the calculated color gamut.

Thus, it is possible to calculate the color gamut in the xy chromaticity directions and the color gamut in the chromaticity (x or y)-luminance (Y) directions as the third color gamut Cg3 of the reference projection surface. Thereby, it is possible to set the target color gamut in the color gamut setter 22 of the subsequent stage.

The color gamut setter 22 sets the second color gamut Cg2 using the first color gamut Cg1 of the first projection surface 31 and the third color gamut Cg3 of the reference projection surface, and outputs the second color gamut Cg2 to the chromaticity converter 23. The second color gamut Cg2 is the target color gamut. More specifically, the color gamut setter 22 sets the region where the first color gamut Cg1 and the second color gamut Cg2 overlap to increase as the difference between the first color gamut Cg1 and the third color gamut Cg3 increases. That is, it is desirable for the color gamut setter 22 to set the second color gamut Cg2 to approach the first color gamut Cg1 as the difference between the first color gamut Cg1 and the third color gamut Cg3 increases.

Figure 7:
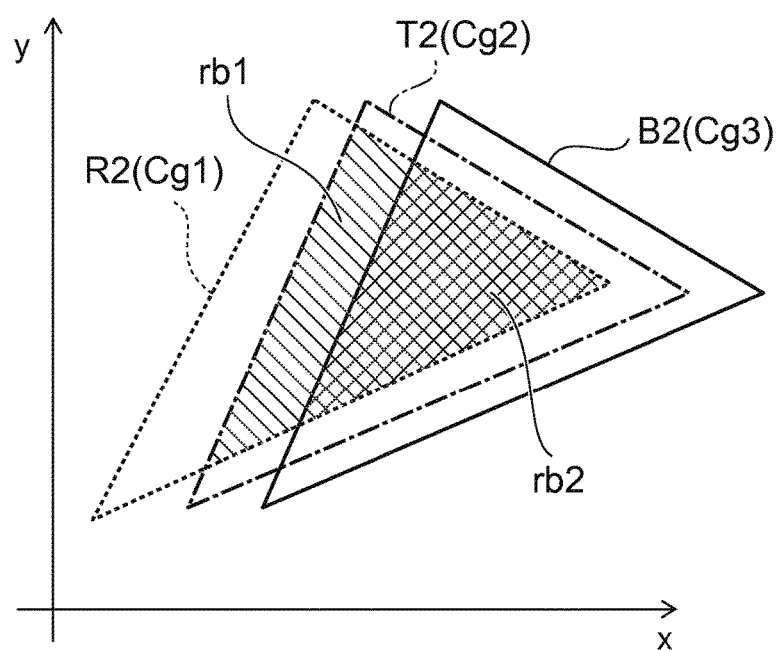
FIG. 7 is a graph of the processing of the color gamut setter according to the second embodiment.

FIG. 7 is a graph of the processing of the color gamut setter 22 according to the second embodiment.

The vertical axis is the y value; and the horizontal axis is the x value. For example, the case is assumed where the first color gamut Cg1 of the first projection surface 31 input from the color gamut detector 21 is the actual color gamut R2, and the third color gamut Cg3 of the reference projection surface is the reference color gamut B2.

Generally, in the case where the projection surface has color, the color of the projection image is corrected using the color inside the color gamut of some reference projection surface as the target color. However, as described above, the color gamut of the projection surface is the range of representable colors when the projection light from the projector 30 is projected onto the projection surface. Therefore, in the case where the actual color gamut R2 and the reference color gamut B2 are greatly dissociated as in FIG. 7, many colors cannot be reproduced; and much color skipping and color collapse occurs.

Conversely, at least a portion of a target color gamut T2 (the second color gamut Cg2) is included in the actual color gamut R2 (the first color gamut Cg1). At least a portion of the reference color gamut B2 (the third color gamut Cg3) is included in the target color gamut T2. That is, for example, the color gamut setter 22 according to the embodiment sets the target color gamut T2 to be between the actual color gamut R2 and the reference color gamut B2 as shown in FIG. 7. A region rb2 where the actual color gamut R2 and the reference color gamut B2 overlap is included in a region rb1 where the actual color gamut R2 and the target color gamut T2 overlap. Thus, the color inside the target color gamut T2 that is set is used as the target color. Thereby, the reproducible colors increase compared to the case where the reference color gamut B2 is reproduced on the actual color gamut R2. Thereby, the color skipping and the color collapse decrease.

Here, it is desirable to set the target color gamut T2 to be between the actual color gamut R2 and the reference color gamut B2. As an example, the setting is performed using the following formula.

$$T2 = IN \cdot (\alpha RW2 + (1-\alpha)BW2) + RB2 \quad (6)$$

Here, RW2 is the reflectance of the actual color gamut R2; BW2 is the reflectance of the reference color gamut B2; and RB2 is the offset of the actual color gamut R2. In Formula (6), $\alpha$ is set in the range of 0.0 to 1.0. Thereby, it is possible to set the target color gamut T2 to be between the actual color gamut R2 and the reference color gamut B2.

In such a case, the a may have various settings in Formula (6). In the example, it is desirable to set $\alpha$ to be large in the case where the difference between the color for the reflectance BW2 and the color for the reflectance RW2 is large, and to set $\alpha$ to be small in the case where the difference between the color for the reflectance BW2 and the color for the reflectance RW2 is small. Also, settings are possible using the color distribution of the first image 51 or external input matching user preferences.

Thus, according to the color gamut setter 22 of the embodiment, a color inside the target color gamut T2 that is set is used as the target color. Thereby, compared to the case where the reference color gamut B2 is reproduced on the actual color gamut R2, the reproducible colors increase; and the color skipping and the color collapse decrease.

Here, second information 32a relating to a second projection surface 32 is further input to the inputter 10. For example, the second information 32a is acquired by the imager 40. The imager 40 acquires an acquired image including at least a portion of the second projection surface 32. A second converted image 55x that has the converted first image 51 that is input is projected onto the second projection surface 32. In other words, the second information 32a is input from the imager 40 to the inputter 10.

The color gamut detector 21 implements second color gamut detection processing. In the second color gamut detection processing, a fourth color gamut Cg4 of the second projection surface 32 is detected based on the second information 32a.

The color gamut setter 22 implements second color gamut setting processing. In the second color gamut setting processing, a fifth color gamut Cg5 is set according to the fourth color gamut Cg4.

The chromaticity converter 23 implements second chromaticity conversion processing. In the second chromaticity conversion processing, a fourth image 54 of the first image 51 having the converted chromaticity is derived. The fourth image 54 includes a color included inside the fifth color gamut Cg5.

The corrector 24 implements second correction processing. In the second correction processing, a fifth image 55 of the corrected fourth image 54 is derived based on the fourth color gamut Cg4. The fifth image 55 corresponds to the second converted image 55x of the converted first image 51 recited above. The fifth image 55 reproduces the fourth image 54 on the second projection surface 32. The fifth image 55 is projected onto the second projection surface 32 by the projector 30. The fourth image 54 is reproduced by the fifth image 55 being projected onto the second projection surface 32.

The hue of the first projection surface 31 is different from the hue of the second projection surface 32. The difference between the hue of the second image 52 and the hue of the first projection surface 31 is smaller than the difference between the hue of the second image 52 and the hue of the second projection surface 32. The difference between the hue of the fourth image 54 and the hue of the second projection surface 32 is smaller than the difference between the hue of the fourth image 54 and the hue of the first projection surface 31.

For example, in the reference example described above, in the case where the color of the reference projection surface is light blue and the color of the projection surface is blue, the input image is corrected so that the color of the image projected onto the blue projection surface approaches the color of the image projected onto the light blue reference projection surface. In the case where the color of the projection surface is green as well, the input image is corrected so that the color of the image projected onto the green projection surface approaches the color of the image projected onto the light blue reference projection surface. That is, even in the case where the hue is different for the two projection surfaces, both of the two projected images have a hue approaching light blue.

Conversely, in the case of the embodiment, the hue of the first projection surface 31 is different from the hue of the second projection surface 32. The hue of the second image 52 is different from the hue of the fourth image 54. That is, different target color gamuts are set in the case where the hue is different between the projection surfaces. Therefore, the two projected images (the second image 52 and the fourth image 54) have different hues. For example, if the color of the projection surface is blue, the projected image has a hue closer to blue than green. If the color of the projection surface is green, the projected image has a hue closer to green than blue.

Third Embodiment

Figure 8:
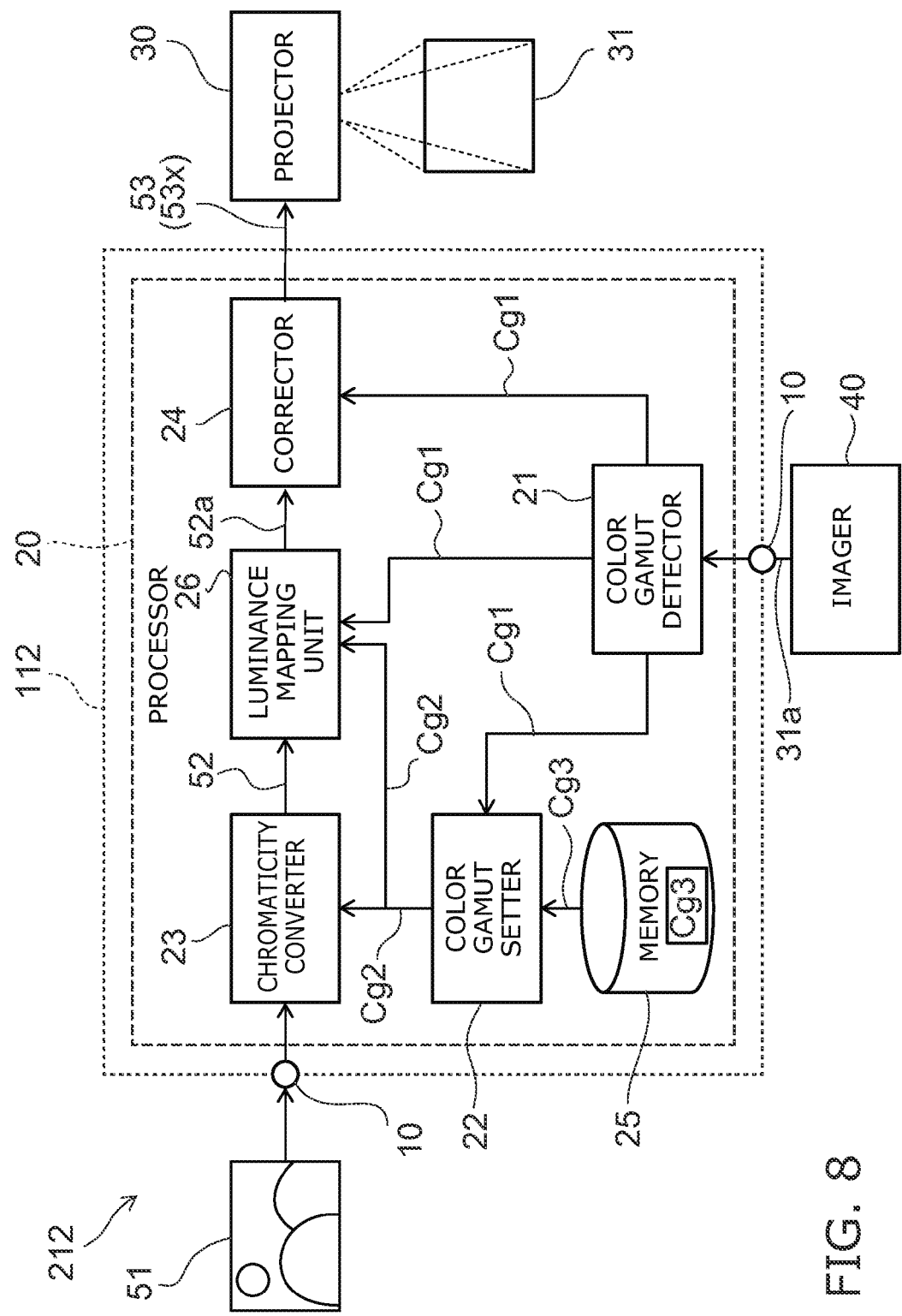
FIG. 8 is a block diagram showing an image processor and an image display device according to the third embodiment.

FIG. 8 is a block diagram showing an image processor and an image display device according to the third embodiment.

The image processor 112 of the embodiment includes the processor 20. The color gamut detector 21, the color gamut setter 22, the chromaticity converter 23, the corrector 24, and the memory 25 are provided in the processor 20; and a luminance mapping unit 26 is further provided in the processor 20. The luminance mapping unit 26 is provided between the chromaticity converter 23 and the corrector 24. The image display device 212 includes the image processor 112, the projector 30, and the imager 40.

The luminance mapping unit 26 implements luminance mapping. In the luminance mapping, the luminance of the second image 52 is converted while maintaining the chromaticity of the second image 52 based on the first color gamut Cg1, the second color gamut Cg2, and a luminance distribution H0 inside a region of at least a portion of the second image 52 (referring to FIG. 9B). The luminance mapping unit 26 outputs, to the corrector 24, a second luminance conversion image 52a after converting the luminance of the second image 52 (i.e., the chromaticity conversion image).

Figure 9:
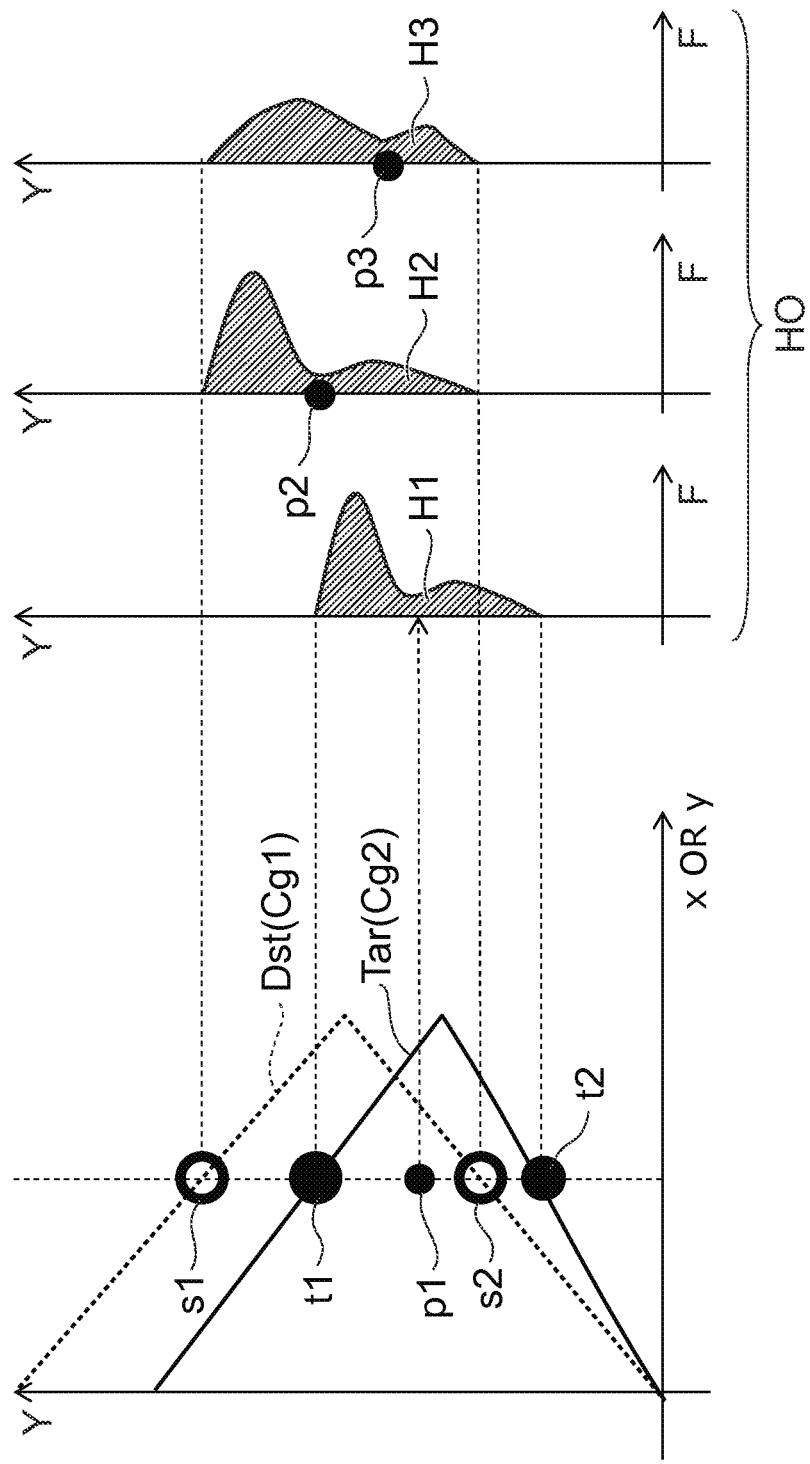
FIG. 9A and FIG. 9B are graphs of the processing of the luminance mapping unit according to the third embodiment.

FIG. 9A and FIG. 9B are graphs of the processing of the luminance mapping unit 26 according to the third embodiment.

FIG. 9A shows a color p1 inside the second image 52, an actual color gamut Dst of the first projection surface 31, and a target color gamut Tar on a chromaticity-luminance graph. The vertical axis is the luminance (Y); and the horizontal axis is the chromaticity (x or y). In the example, the first color gamut Cg1 is the actual color gamut Dst; and the second color gamut Cg2 is the target color gamut Tar.

FIG. 9B shows the luminance histogram (the luminance distribution H0) of the second image 52 before and after the processing of the luminance mapping unit 26. The vertical axis is the luminance (Y); and the horizontal axis is the frequency (F).

As shown in FIG. 9A, in the luminance mapping unit 26, the range of the luminance is converted for the color p1 inside the actual color gamut Dst using the following formula.

$$p2 = (((p1-s2)/(s1-s2)) \cdot (t1-t2)) + t2 \quad (7)$$

Here, p2 is the luminance value after the range conversion of p1. s1 is the upper limit of the luminance for which the same chromaticity as p1 calculated based on the actual color gamut Dst can be reproduced. s2 is the lower limit of the luminance for which the same chromaticity as p1 calculated based on the actual color gamut Dst can be reproduced. t1 is the upper limit of the luminance for which the same chromaticity as p1 calculated based on the target color gamut Tar can be reproduced. t2 is the lower limit of the luminance for which the same chromaticity as p1 calculated based on the target color gamut Tar can be reproduced.

H1 of FIG. 9B is the luminance distribution of the second image 52 prior to the range conversion of the luminance. H2 of FIG. 9B is the luminance distribution after the range conversion of the luminance. In other words, a luminance distribution H1 is converted into the luminance distribution H2 using Formula (7).

Thus, it is possible for the luminance value of the color p1 inside the second image 52 in the target color gamut Tar to be within the actual color gamut Dst. Generally, a target color that is not inside the actual color gamut Dst (outside the color gamut) cannot be reproduced on the projection surface. However, according to the embodiment, it is possible to generate a corrected image that reproduces the target color on the projection surface in the corrector 24 of the subsequent stage.

Then, a contrast conversion is performed based on the luminance distribution H2 after the range conversion of the luminance. The contrast conversion method may be a general method such as histogram smoothing, Contrast Limited Adaptive Histogram Equalization, etc.

At this time, as shown in FIG. 9B, a conversion is implemented to increase the luminance contrast of the luminance distribution H2 after the range conversion of the luminance around a luminance value having a high frequency. Thereby, the luminance distribution H2 after the range conversion of the luminance is converted by the contrast conversion to a luminance distribution H3 after the contrast conversion. As a result, the luminance value p2 after the range conversion is converted to a luminance value p3 after the contrast conversion.

Thus, it is possible to perform a conversion to improve the luminance contrast while containing the luminance value of the color p1 inside the second image 52 of the target color gamut Tar inside the actual color gamut Dst. Thereby, the image quality of the final projection image can be increased.

Finally, the luminance mapping unit 26 generates the second luminance conversion image 52a (the target image) in which the luminance of the second image 52 is converted using the results of the calculation of the luminance value p3 for all of the pixel values of the second image 52, and outputs the second luminance conversion image 52a to the corrector 24.

Thus, according to the luminance mapping unit 26 of the embodiment, the second luminance conversion image 52a (the target image) can be output in which the luminance is converted while maintaining the chromaticity of the second image 52 based on the brightness distribution inside a region including at least a portion of the second image 52 by using the second image 52, the actual color gamut Dst, and the target color gamut Tar. Thereby, it is possible to generate a target image having improved luminance contrast while containing the luminance value of the color p1 inside the second image 52 of the target color gamut Tar inside the actual color gamut Dst.

Fourth Embodiment

Figure 10:
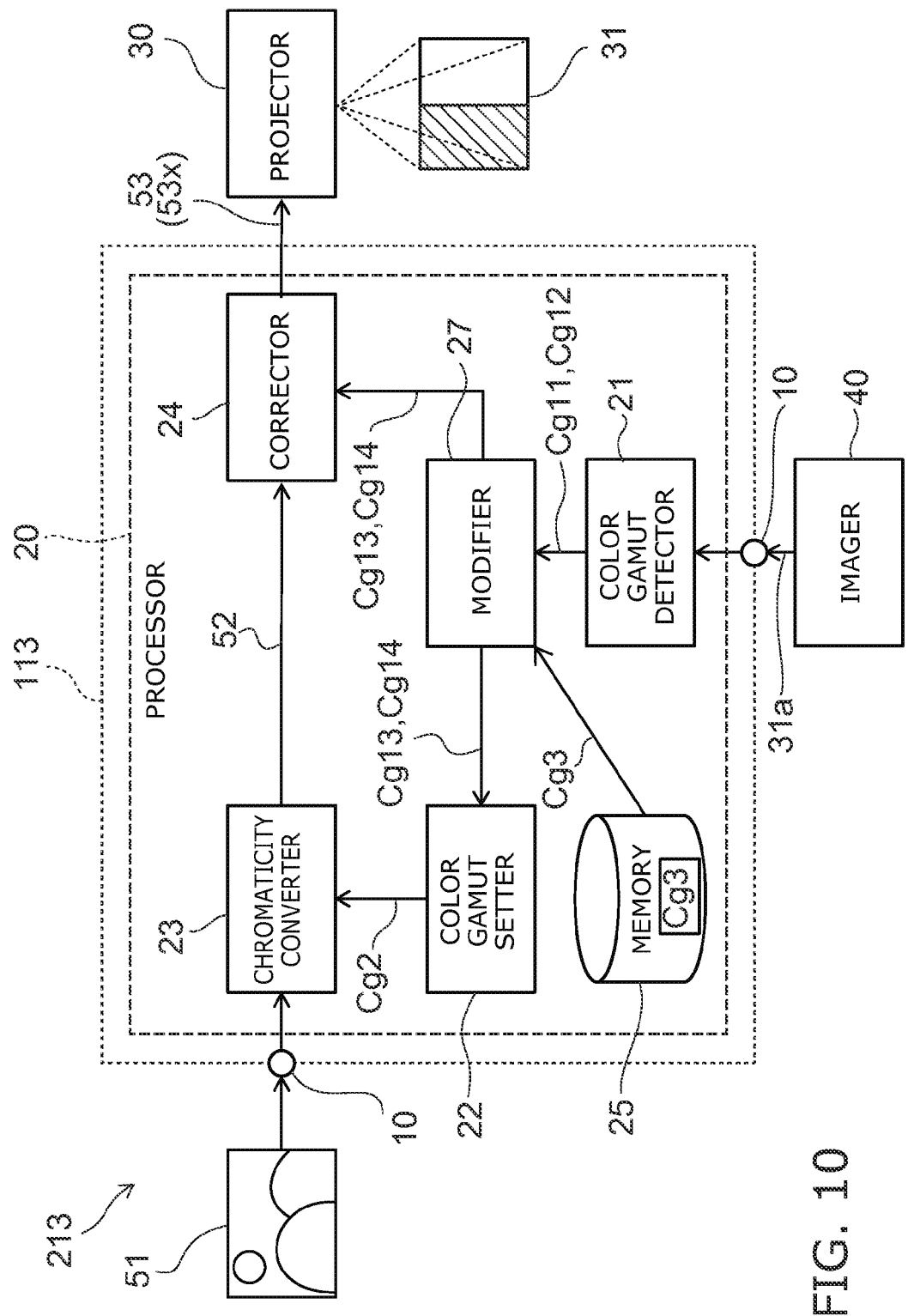
FIG. 10 is a block diagram showing an image processor and an image display device according to the fourth embodiment.

FIG. 10 is a block diagram showing an image processor and an image display device according to the fourth embodiment.

The image processor 113 of the embodiment includes the processor 20. The color gamut detector 21, the color gamut setter 22, the chromaticity converter 23, the corrector 24, and the memory 25 are provided in the processor 20; and a modifier 27 is further provided in the processor 20. The image display device 213 includes the image processor 113, the projector 30, and the imager 40.

The color gamut detector 21 detects the first color gamut Cg1 of the first projection surface 31. The first color gamut Cg1 includes, for example, a first color gamut portion Cg11 and a second color gamut portion Cg12. The color gamut of the first color gamut portion Cg11 is different from the color gamut of the second color gamut portion Cg12. The color gamut detector 21 detects the first color gamut portion Cg11 and the second color gamut portion Cg12 and outputs the first color gamut portion Cg11 and the second color gamut portion Cg12 to the modifier 27.

The memory 25 stores the third color gamut Cg3 of the reference projection surface. The third color gamut Cg3 is output from the memory 25 to the modifier 27.

The modifier 27 implements color gamut modification processing. In the color gamut modification processing, the first color gamut portion Cg11 is modified to a third color gamut portion Cg13 and the second color gamut portion Cg12 is modified to a fourth color gamut portion Cg14 based on the first color gamut portion Cg11, the second color gamut portion Cg12, and the third color gamut Cg3. The third color gamut portion Cg13 and the fourth color gamut portion Cg14 are output to the color gamut setter 22 and the corrector 24.

The color gamut setter 22 implements the first color gamut setting processing. In the first color gamut setting processing, the second color gamut Cg2 is set according to the third color gamut portion Cg13 and the fourth color gamut portion Cg14. As described above, the second color gamut Cg2 is the target color gamut. The second color gamut Cg2 is output to the chromaticity converter 23.

The chromaticity converter 23 converts the chromaticity of the first image 51 to derive the second image 52 made of colors included in the second color gamut Cg2. The second image 52 is output to the corrector 24.

The corrector 24 implements the first correction processing. In the first correction processing, the third image 53 of the corrected second image 52 is derived based on the third color gamut portion Cg13 and the fourth color gamut portion Cg14. The third image 53 corresponds to the first converted image 53x of the converted first image 51 described above. The third image 53 reproduces the second image 52 on the first projection surface 31. The third image 53 is projected onto the first projection surface 31 by the projector 30. The second image 52 is reproduced by the third image 53 being projected onto the first projection surface 31.

Figure 11C:
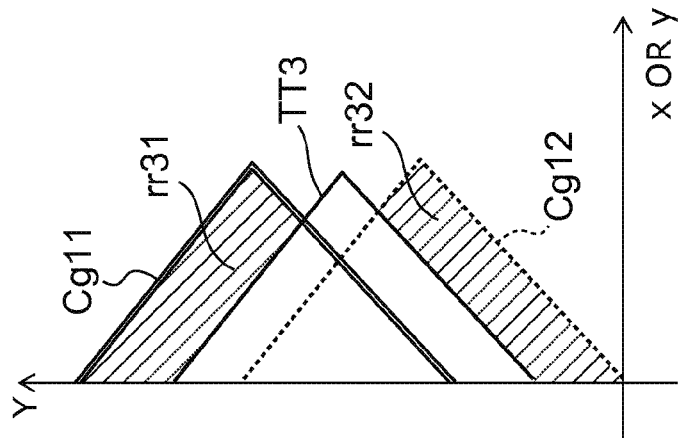
FIG. 11A to FIG. 11C are graphs of the color gamuts.
Figure 11B:
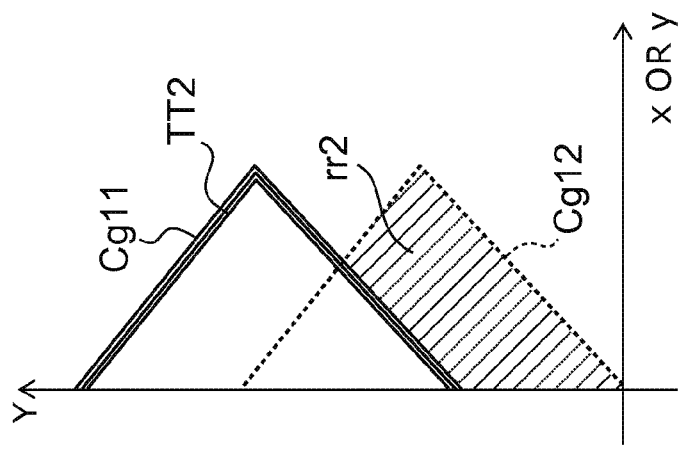
Figure 11A:
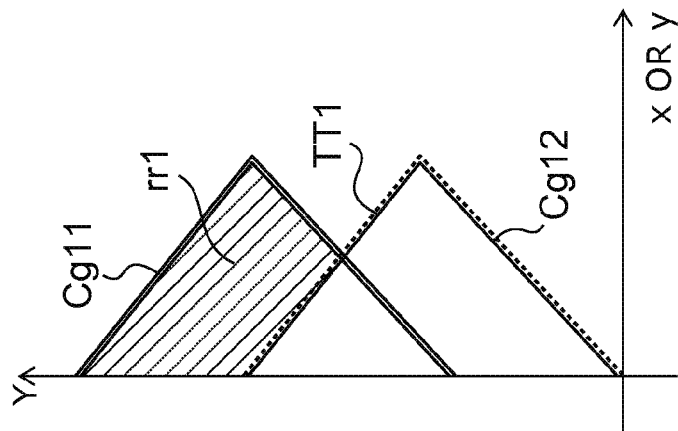

FIG. 11A to FIG. 11C are graphs of the color gamuts.

In the figures, the vertical axis is the Y value (the luminance); and the horizontal axis is the x value or the y value (the chromaticity).

In the embodiment, the case is assumed where the first projection surface 31 has a nonuniform pattern. The first color gamut portion Cg11 is the color gamut of the portion of the first color gamut Cg1 having a brighter pattern; and the second color gamut portion Cg12 is the color gamut of the portion of the first color gamut Cg1 having a darker pattern. The first color gamut Cg1 has different color gamuts for each portion.

As shown in FIG. 11A, in the case where a target color gamut TT1 is set to approach the second color gamut portion Cg12, the surface area of a region rr1 where the target color gamut TT1 and the first color gamut portion Cg11 do not overlap is large. In such a case, much failure such as color collapse, etc., occurs in the corrected image on the projection surface including the first color gamut portion Cg11.

As shown in FIG. 11B, in the case where a target color gamut TT2 is set to approach the first color gamut portion Cg11, the surface area of a region rr2 where the target color gamut TT2 and the second color gamut portion Cg12 do not overlap is large. In such a case, much failure such as color skipping, etc., occurs in the corrected image on the projection surface including the second color gamut portion Cg12.

As shown in FIG. 11C, in the case where a target color gamut TT3 is set to be between the first color gamut portion Cg11 and the second color gamut portion Cg12, a region rr31 occurs where the target color gamut TT3 and the first color gamut portion Cg11 do not overlap; and a region rr32 occurs where the target color gamut TT3 and the second color gamut portion Cg12 do not overlap. In such a case, much failure such as color collapse, color skipping, etc., occurs in the corrected image on the projection surface of the first color gamut portion Cg11; and much failure such as color collapse, color skipping, etc., and occurs in the corrected image on the projection surface of the second color gamut portion Cg12.

Figure 12A:
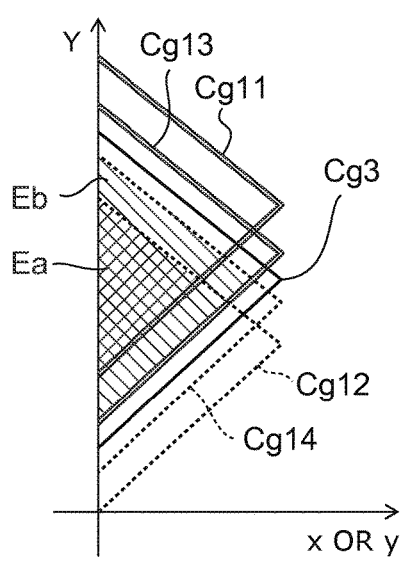
FIG. 12A and FIG. 12B are graphs of the processing of the modifier according to the fourth embodiment.
Figure 12B:
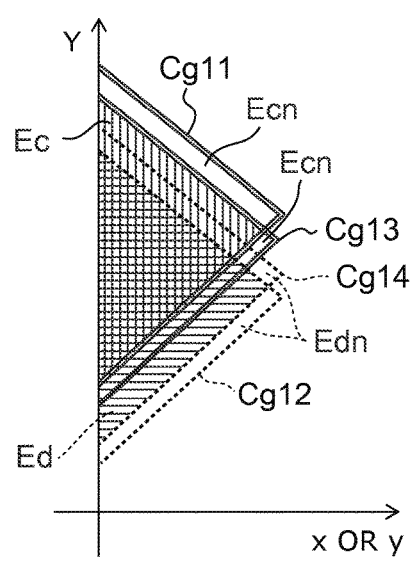

FIG. 12A and FIG. 12B are graphs of the processing of the modifier according to the fourth embodiment.

In the figures, the vertical axis is the Y value (the luminance); and the horizontal axis is the x value or the y value (the chromaticity).

The modifier 27 according to the embodiment modifies the first color gamut portion Cg11 to the third color gamut portion Cg13 and modifies the second color gamut portion Cg12 to the fourth color gamut portion Cg14 based on the first color gamut portion Cg11, the second color gamut portion Cg12, and the third color gamut Cg3.

As shown in FIG. 12A, the surface area of a region Eb where the third color gamut Cg3, the third color gamut portion Cg13, and the fourth color gamut portion Cg14 overlap is greater than the surface area of a region Ea where the third color gamut Cg3, the first color gamut portion Cg11, and the second color gamut portion Cg12 overlap. For example, the third color gamut portion Cg13 and the fourth color gamut portion Cg14 are derived so that the surface area of the region Ea is a maximum. Specifically, the surface area of the region Ea changes as the first color gamut portion Cg11 and the second color gamut portion Cg12 are moved in directions approaching each other along the Y-axis. The surface area of the region Ea has a maximum at some position. The region Ea when the surface area is the maximum can be determined as the region Eb.

That is, the first color gamut portion Cg11 of the region Eb is derived as the third color gamut portion Cg13. The difference between the third color gamut portion Cg13 and the third color gamut Cg3 is smaller than the difference between the first color gamut portion Cg11 and the third color gamut Cg3. Similarly, the second color gamut portion Cg12 of the region Eb is derived as the fourth color gamut portion Cg14. The difference between the fourth color gamut portion Cg14 and the third color gamut Cg3 is smaller than the difference between the second color gamut portion Cg12 and the third color gamut Cg3.

Thus, the difference between the third color gamut Cg3 of the reference and the third color gamut portion Cg13 after the modification can be reduced; and the difference between the third color gamut Cg3 of the reference and the fourth color gamut portion Cg14 after the modification can be reduced. Therefore, in the processing of the corrector 24 of the subsequent stage, failures such as color collapse, color skipping, etc., of the corrected image can be reduced.

In particular, the color collapse, color skipping, etc., of the projection image can be reduced in the case where the color difference of the pattern of the projection surface is large. Therefore, for example, even in the case where the projection surface includes a pattern having a large color difference such as a wall surface inside a retail store, a wall surface inside an event hall, etc., it is possible to view a good projection image without failure.

Here, the first color gamut Cg1 of the first projection surface 31 includes the actual first color gamut portion Cg11 and the actual second color gamut portion Cg12. Conversely, the third color gamut portion Cg13 is the modified first color gamut portion Cg11 and is different from the actual color gamut; and the fourth color gamut portion Cg14 is the modified second color gamut portion Cg12 and is different from the actual color gamut. Therefore, in the case where the dissociation between the first color gamut portion Cg11 and the third color gamut portion Cg13 is large and the dissociation between the second color gamut portion Cg12 and the fourth color gamut portion Cg14 is large, the shifting of the correction intensity in the processing of the corrector 24 increases; and there is a possibility that the corrected color cannot be reproduced correctly.

Conversely, in the embodiment as shown in FIG. 12B, the surface area of a region Ec where the first color gamut portion Cg11 and the third color gamut portion Cg13 overlap is greater than the surface area of a region Ecn where the first color gamut portion Cg11 and the third color gamut portion Cg13 do not overlap. The surface area of a region Ed where the second color gamut portion Cg12 and the fourth color gamut portion Cg14 overlap is greater than the surface area of a region Edn where the second color gamut portion Cg12 and the fourth color gamut portion Cg14 do not overlap. For example, the third color gamut portion Cg13 may be derived so that the surface area of the region Ec is a maximum. Similarly, the fourth color gamut portion Cg14 may be derived so that the surface area of the region Ed is a maximum.

Thereby, the dissociation between the first color gamut portion Cg11 and the third color gamut portion Cg13 can be reduced; and the dissociation between the second color gamut portion Cg12 and the fourth color gamut portion Cg14 can be reduced. Therefore, it is possible to correctly reproduce the corrected color in the processing of the corrector 24 of the subsequent stage.

In particular, in the case where the color difference of the pattern of the projection surface is small, the third color gamut portion Cg13 is calculated so that the surface area of the region Ec is a maximum or substantially a maximum; and the fourth color gamut portion Cg14 is calculated so that the surface area of the region Ed is a maximum or substantially a maximum. Thereby, a corrected image in which the pattern of the projection image is canceled can be generated correctly. Therefore, for example, a good projection image in which the pattern is canceled can be viewed for a projection surface including a pattern having a small color difference such as a wall surface inside an office, a wall surface inside a general household, etc.

In the embodiment, it is desirable for the sum of the surface area of the region Eb, the surface area of the region Ec, and the surface area of the region Ed to be larger than the sum of the surface area of the region Ea, the surface area of the region Ecn, and the surface area of the region Edn. For example, the third color gamut portion Cg13 and the fourth color gamut portion Cg14 may be derived so that the weighted linear sum of the surface area of the region Eb, the surface area of the region Ec, and the surface area of the region Ed are maximums.

In the color gamut modification processing according to the embodiment, the first image 51 may be used in addition to the first color gamut portion Cg11, the second color gamut portion Cg12, and the third color gamut Cg3. In such a case, the surface area of the region Eb is the surface area of the region where the color gamut including all of the colors of the first image 51 reproduced inside the third color gamut Cg3, the color gamut including all of the colors of the first image 51 reproduced inside the first color gamut portion Cg11, and the color gamut including all of the colors of the first image 51 reproduced inside the second color gamut portion Cg12 overlap. The surface area of the region Ec is the surface area of the region where the color gamut including all of the colors of the first image 51 reproduced inside the first color gamut portion Cg11 and the color gamut including all of the colors of the first image 51 reproduced inside the third color gamut portion Cg13 overlap. The surface area of the region Ed is the surface area of the region where the color gamut including all of the colors of the first image 51 reproduced inside the second color gamut portion Cg12 and the color gamut including all of the colors of the first image 51 reproduced inside the fourth color gamut portion Cg14 overlap. The third color gamut portion Cg13 and the fourth color gamut portion Cg14 may be derived so that the weighted linear sum of the surface area of the region Eb, the surface area of the region Ec, and the surface area of the region Ed are maximums.

Thereby, the difference between the third color gamut Cg3 of the reference and the third color gamut portion Cg13 after the modification can be reduced; and the difference between the third color gamut Cg3 of the reference and the fourth color gamut portion Cg14 after the modification can be reduced. Further, the dissociation between the first color gamut portion Cg11 and the third color gamut portion Cg13 can be reduced; and the dissociation between the second color gamut portion Cg12 and the fourth color gamut portion Cg14 can be reduced. Therefore, in the processing of the corrector 24 of the subsequent stage, it is possible to reduce failures such as color collapse, color skipping, etc., of the corrected image and correctly reproduce the corrected color.

Failure such as color collapse, color skipping, etc., of the corrected image can be reduced and the corrected color can be reproduced correctly regardless of whether the color difference of the pattern of the projection surface is small or large. Thereby, the image quality of projection surfaces such as walls including various patterns, etc., can be improved robustly.

The case is described in the example recited above where the multiple color gamut portions included in the first color gamut Cg1 are at least the two types of the first color gamut portion Cg11 and the second color gamut portion Cg12. The embodiment is applicable similarly even in the case where the first color gamut Cg1 is divided into N (N≥3) types of color gamut portions. In such a case, it is sufficient to calculate the color gamut portion modified using a similar method for each of the color gamut portions.

The modifier 27 may calculate the third color gamut portion Cg13 and the fourth color gamut portion Cg14 using the second color gamut portion Cg12, the first color gamut portion Cg11, and the second image 52 output from the chromaticity converter 23. At this time, the third color gamut portion Cg13 and the fourth color gamut portion Cg14 are calculated considering the second image 52 so that the color collapse, the color skipping, etc., are minimal.

Thus, by using the second image 52 in addition to the first color gamut portion Cg11 and the second color gamut portion Cg12, a good projection image can be viewed without the occurrence of failures such as color collapse, color skipping, etc., of the corrected image in the processing of the corrector 24 of the subsequent stage.

The modifier 27 may perform various changes of the weight of the region Eb, the region Ec, and the region Ed in the weighted linear sum of the region Eb, the region Ec, and the region Ed according to content information that is projected and user input from the outside. For example, in the case where the content information is characters, the visibility of the characters can be increased by increasing the weight of the region Eb. The corrected color can be reproduced correctly by the weight of the region Ec and the region Ed being increased by the user input.

The modifier 27 may perform all of the processing described above for each local region including at least a portion of the projection surface. By performing the processing for each local region, failures such as color collapse, color skipping, etc., of the corrected image can be reduced and the corrected color can be reproduced correctly even in the case where the pattern of the projection surface changes with a fine period.

Fifth Embodiment

Figure 13:
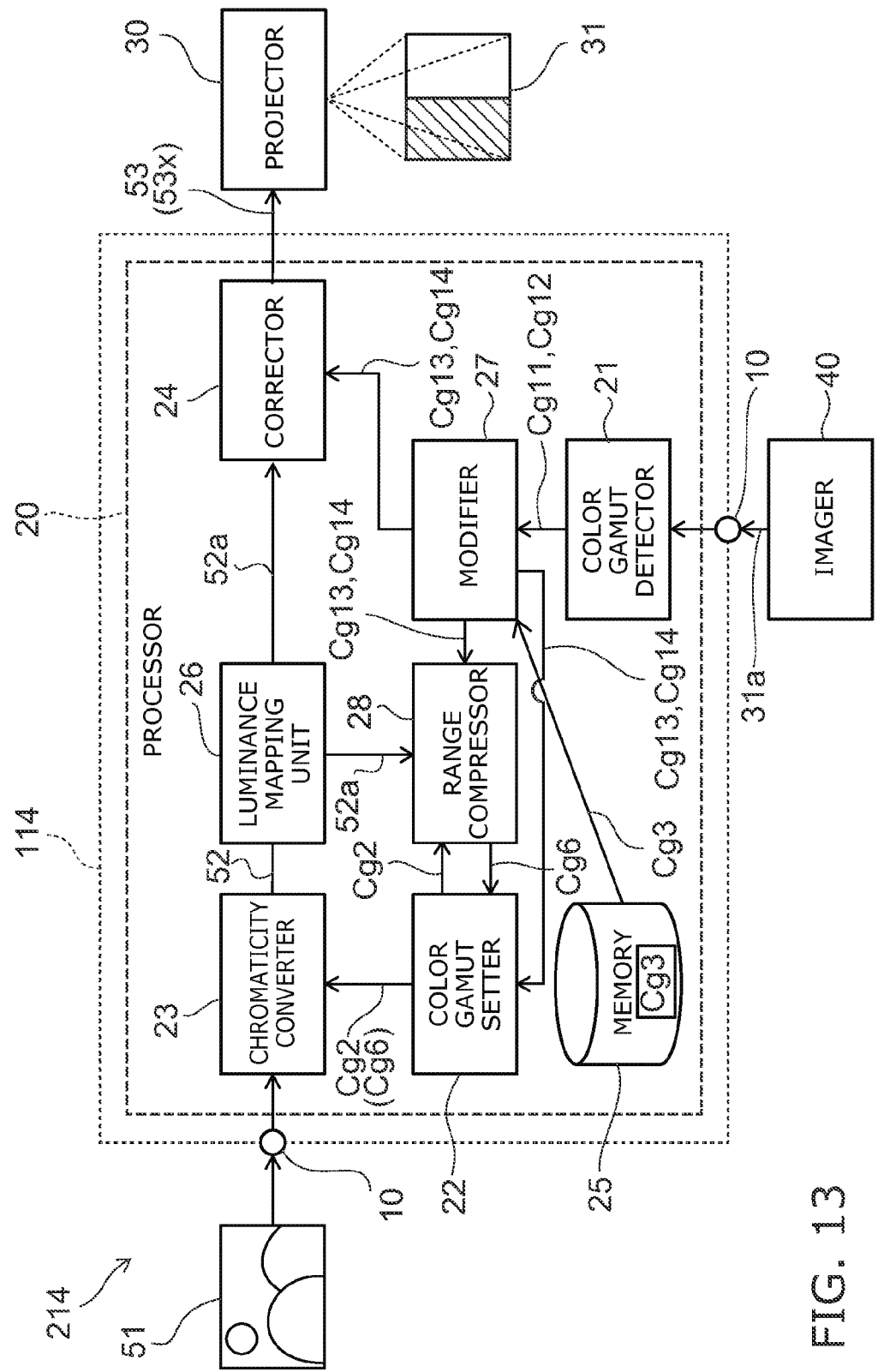
FIG. 13 is a block diagram showing an image processor and an image display device according to the fifth embodiment.

FIG. 13 is a block diagram showing an image processor and an image display device according to the fifth embodiment.

The image processor 114 of the embodiment includes the processor 20. The color gamut detector 21, the color gamut setter 22, the chromaticity converter 23, the corrector 24, the memory 25, the luminance mapping unit 26, and the modifier 27 are provided in the processor 20; and a range compressor 28 is further provided in the processor 20. The image display device 214 includes the image processor 114, the projector 30, and the imager 40.

The color gamut detector 21 detects the first color gamut Cg1 of the first projection surface 31. The first color gamut Cg includes, for example, the first color gamut portion Cg11 and the second color gamut portion Cg12. The color gamut of the first color gamut portion Cg11 is different from the color gamut of the second color gamut portion Cg12. The color gamut detector 21 detects the first color gamut portion Cg11 and the second color gamut portion Cg12 and outputs the first color gamut portion Cg11 and the second color gamut portion Cg12 to the modifier 27.

The memory 25 stores the third color gamut Cg3 of the reference projection surface. The third color gamut Cg3 is output from the memory 25 to the modifier 27.

The modifier 27 implements the color gamut modification processing. In the color gamut modification processing, the first color gamut portion Cg11 is modified to the third color gamut portion Cg13 and the second color gamut portion Cg12 is modified to the fourth color gamut portion Cg14 based on the first color gamut portion Cg11, the second color gamut portion Cg12, and the third color gamut Cg3. The third color gamut portion Cg13 and the fourth color gamut portion Cg14 are output to the range compressor 28, the color gamut setter 22, and the corrector 24.

The color gamut setter 22 implements the first color gamut setting processing. In the first color gamut setting processing, the second color gamut Cg2 is set according to the third color gamut portion Cg13 and the fourth color gamut portion Cg14. As described above, the second color gamut Cg2 is the target color gamut. The second color gamut Cg2 is output to the chromaticity converter 23.

The chromaticity converter 23 converts the chromaticity of the first image 51 to derive the second image 52 made of colors included in the second color gamut Cg2. The second image 52 is output to the luminance mapping unit 26.

The luminance mapping unit 26 implements the luminance mapping. The luminance mapping converts the luminance of the second image 52 while maintaining the chromaticity of the second image 52 based on the third color gamut portion Cg13, the fourth color gamut portion Cg14, the second color gamut Cg2, and the luminance distribution inside a region of at least a portion of the second image 52. The luminance mapping unit 26 outputs, to the corrector 24 and the range compressor 28, the second luminance conversion image 52a after the conversion of the luminance of the second image 52 (i.e., the chromaticity conversion image).

The range compressor 28 implements range compression processing. In the range compression processing, a sixth color gamut Cg6 in which the luminance range of the second color gamut Cg2 is compressed is calculated based on the second color gamut Cg2, the third color gamut portion Cg13, the fourth color gamut portion Cg14, and the second luminance conversion image 52a. The sixth color gamut Cg6 is output to the color gamut setter 22.

The color gamut setter 22 sets the sixth color gamut Cg6 instead of the second color gamut Cg2. The sixth color gamut Cg6 is output to the chromaticity converter 23.

Figure 14A:
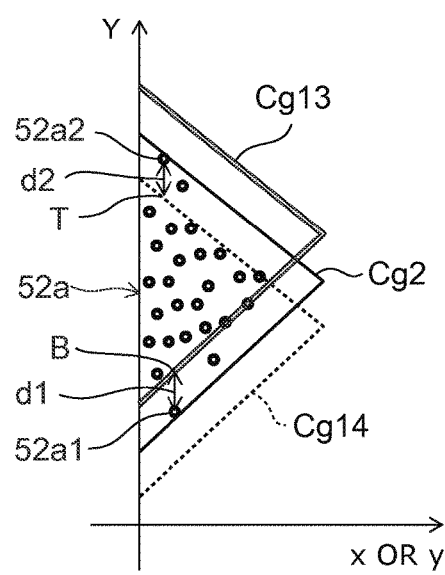
FIG. 14A and FIG. 14B are graphs of the processing of the range compressor according to the fifth embodiment.
Figure 14B:
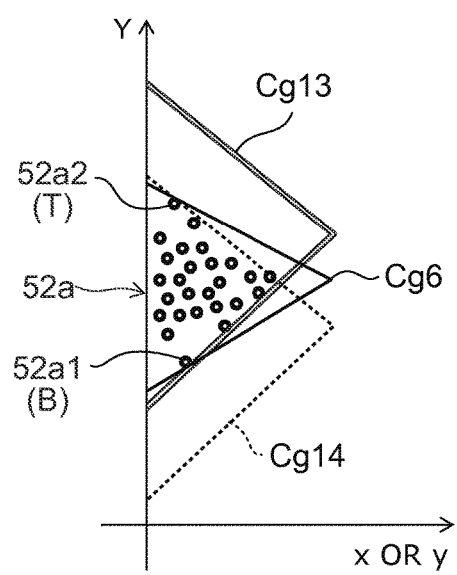

FIG. 14A and FIG. 14B are graphs of the processing of the range compressor according to the fifth embodiment.

In the figures, the vertical axis is the Y value (the luminance); and the horizontal axis is the x value or the y value (the chromaticity).

FIG. 14A and FIG. 14B show the second color gamut Cg2, the second luminance conversion image 52a (the round symbols in the figure) converted to be inside the second color gamut Cg2, the third color gamut portion Cg13, and the fourth color gamut portion Cg14 plotted on a chromaticity diagram.

As shown in FIG. 14A, the second luminance conversion image 52a includes a first luminance mapping image 52a1 and a second luminance mapping image 52a2. The first luminance mapping image 52a1 juts from the range of the third color gamut portion Cg13; and there is a possibility that color collapse may occur in the corrected image generation performed by the corrector 24. Also, the second luminance mapping image 52a2 juts from the range of the fourth color gamut portion Cg14; and there is a possibility that color skipping, etc., may occur in the corrected image generation performed by the corrector 24. In such a case, a first jut amount d1 is the jut amount on the first luminance mapping image 52a1 side; and a second jut amount d2 is the jut amount on the second luminance mapping image 52a2 side.

In the embodiment, the sixth color gamut Cg6 in which the range of the luminance is compressed is calculated as shown in FIG. 14B using the first jut amount d1 and the second jut amount d2. Specifically, the color gamut on the black side of the second color gamut Cg2 is raised using the maximum value of the first jut amount d1. At this time, the first luminance mapping image 52a1 is converted to be inside the third color gamut portion Cg13. The color gamut on the white side of the second color gamut Cg2 is lowered using the maximum value of the second jut amount d2. At this time, the second luminance mapping image 52a2 is converted to be inside the fourth color gamut portion Cg14. Thus, the sixth color gamut Cg6 is calculated by converting the second color gamut Cg2. In the sixth color gamut Cg6, the range of the luminance is narrower than the range of the luminance that is reproduced in the second color gamut Cg2 while maintaining the chromaticity that is reproduced in the second color gamut Cg2.

In other words, the range compressor 28 calculates a maximum luminance T and a minimum luminance B so that the same chromaticity as the second luminance conversion image 52a reproduced inside the second color gamut Cg2 can be maintained based on the third color gamut portion Cg13, the fourth color gamut portion Cg14, the second luminance conversion image 52a, and the second color gamut Cg2. Then, the second color gamut Cg2 is converted into the sixth color gamut Cg6 based on the maximum luminance T and the minimum luminance B.

By using the sixth color gamut Cg6 calculated as recited above, there is no jutting from the third color gamut portion Cg13 and the fourth color gamut portion Cg14 for both the first luminance mapping image 52a1 and the second luminance mapping image 52a2. Therefore, in the corrected image generation performed by the corrector 24, it is possible to generate a corrected image without the color collapse, color skipping, etc.

The range compressor 28 may calculate the sixth color gamut Cg6 using a temporally-smoothed second luminance conversion image 52a by performing internal buffering of the second luminance conversion image 52a. By performing the internal buffering of the second luminance conversion image 52a, the sixth color gamut Cg6 that is calculated previously may be output when luminance change amount at least in a partial region of the second luminance conversion image 52a per time exceeds the threshold. By combining with such buffering, it is possible to reduce artifacts such as flickering, etc., occurring due to a scene change when reproducing a video image.

Although the surface area of the regions where the color gamuts overlap is illustrated in the embodiments using chromaticity diagrams (color gamut graphs), the embodiments are applicable similarly by replacing the surface area with the volume of the regions where the color gamuts overlap. In such a case, it is sufficient to set the Z-direction in the chromaticity diagram to be the Y value (the luminance), set the X-direction to be the x value or the y value (the chromaticity), and set the Y-direction to be the y value or the x value (the chromaticity).

Although an image processor, an image display device, and an image processing method are illustrated as the embodiments described above, the embodiments may have the form of an image processing program for causing a computer to execute the image processing method or the form of a computer-readable recording medium in which the image processing program is recorded.

Specifically, CD-ROM (-R/-RW), a magneto-optical disk, a HD (hard disk), DVD-ROM (-R/-RW/-RAM), a FD (flexible disk), flash memory, a memory card, a memory stick, other various ROM, RAM, etc., are possible as the recording medium; and the image processing method of the embodiments described above is easy to realize by recording the image processing program for causing the computer to execute the method in the recording medium and by distributing the image processing program. The image processing method of the embodiments may be executed by mounting a recording medium such as that recited above to an information processor such as a computer, etc., and the image processing program being read by the information processor, or by the image processing program being pre-stored in a storage medium included in the information processor and the image processing program being read as necessary.

According to the embodiments, an image processor, an image display device, and an image processing method that can provide a high-quality projected image can be provided.

Hereinabove, embodiments of the invention are described with reference to specific examples. However, the invention is not limited to these specific examples. For example, one skilled in the art may similarly practice the invention by appropriately selecting specific configurations of components such as the inputter, the processor, etc., from known art; and such practice is within the scope of the invention to the extent that similar effects can be obtained.

Any two or more components of the specific examples may be combined within the extent of technical feasibility and are within the scope of the invention to the extent that the spirit of the invention is included.

All image processors, image display devices, and image processing methods practicable by an appropriate design modification by one skilled in the art based on the image processor, the image display device, and the image processing method described above as embodiments of the invention are within the scope of the invention to the extent that the spirit of the invention is included.

Various modifications and alterations within the spirit of the invention will be readily apparent to those skilled in the art; and all such modifications and alterations should be seen as being within the scope of the invention.

Although several embodiments of the invention are described, these embodiments are presented as examples and are not intended to limit the scope of the invention. These novel embodiments may be implemented in other various forms; and various omissions, substitutions, and modifications can be performed without departing from the spirit of the invention. Such embodiments and their modifications are within the scope and spirit of the invention and are included in the invention described in the claims and their equivalents.

What is claimed is:

1. An image processor, comprising:
a processor configured to implement at least:
acquiring a first image, and first information indicating a condition of a first projection surface, the first information including a first color gamut of the first projection surface;
deriving a second color gamut based on the first color gamut;
converting a chromaticity of the first image to obtain a second image, each pixel of the second image having a color included in the second color gamut; and
generating a first converted image by correcting the second image based on the first color gamut.

2. The image processor according to claim 1, wherein
the second image has a first color,
the first projection surface has a second color,
a third color is based on a difference between the first color and the second color,
the first converted image has a fourth color, and
a color difference ΔEab between the third color and the fourth color is 6.0 or less.

3. The image processor according to claim 1, wherein
the second color gamut includes a first region not overlapping the first color gamut and a second region overlapping the first color gamut, and
an area of the first region is less than an area of the second region.

4. The image processor according to claim 1, further comprising a memory storing a third color gamut, and
the deriving includes setting the second color gamut based on the first color gamut and the third color gamut.

5. The image processor according to claim 4, wherein
at least a portion of the second color gamut is included in the first color gamut, and
at least a portion of the third color gamut is included in the second color gamut.

6. The image processor according to claim 4, wherein
the deriving includes setting the second color gamut so that an area of a region where the first color gamut and the second color gamut overlap increases as a difference between the first color gamut and the third color gamut increases.

7. The image processor according to claim 4, wherein
the first color gamut includes a first color gamut portion and a second color gamut portion,
the processor is further configured to implement color gamut modifying, the color gamut modifying including modifying the first color gamut portion to a third color gamut portion and modifying the second color gamut portion to a fourth color gamut portion based on the first color gamut portion, the second color gamut portion, and the third color gamut,
the deriving further includes deriving the second color gamut based on the third color gamut portion and the fourth color gamut portion, and
the generating further includes generating the first converted image by correcting the second image based on the third color gamut portion and the fourth color gamut portion.

8. The image processor according to claim 7, wherein
an area of a region where the third color gamut, the third color gamut portion, and the fourth color gamut portion overlap is greater than an area of a region where the third color gamut, the first color gamut portion, and the second color gamut portion overlap.

9. The image processor according to claim 7, wherein
an area of a region where the first color gamut portion and the third color gamut portion overlap is greater than an area of a region where the first color gamut portion and the third color gamut portion do not overlap, and
an area of a region where the second color gamut portion and the fourth color gamut portion overlap is greater than an area of a region where the second color gamut portion and the fourth color gamut portion do not overlap.

10. The image processor according to claim 7, wherein
the sum of an area of a region where the third color gamut, the third color gamut portion, and the fourth color gamut portion overlap, an area of a region where the first color gamut portion and the third color gamut portion overlap, and an area of a region where the second color gamut portion and the fourth color gamut portion overlap is larger than the sum of an area of a region where the third color gamut, the first color gamut portion, and the second color gamut portion overlap, an area of a region where the first color gamut portion and the third color gamut portion do not overlap, and a surface area of a region where the second color gamut portion and the fourth color gamut portion do not overlap.

11. The image processor according to claim 1, wherein
the processor is further configured to implement luminance mapping, and
the luminance mapping includes converting a luminance of the second image while maintaining a chromaticity of the second image based on the first color gamut, the second color gamut, and a luminance distribution inside a region of at least a portion of the second image.

12. The image processor according to claim 1, wherein
the acquiring further includes acquiring second information indicating a condition of a second projection surface, the second information including a fourth color gamut of the second projection surface, the deriving further includes deriving a fifth color gamut based on the fourth color gamut, the converting further includes converting a chromaticity of the first image to obtain a fourth image, each pixel of the fourth image having a color included in the fifth color gamut, and the generating further includes generating a second converted image by correcting the fourth image based on the fourth color gamut, wherein a hue of the first projection surface is different from a hue of the second projection surface, a difference between a hue of the second image and the hue of the first projection surface is smaller than a difference between the hue of the second image and the hue of the second projection surface, and a difference between a hue of the fourth image and the hue of the second projection surface is smaller than a difference between the hue of the fourth image and the hue of the first projection surface.

13. An image display device, comprising:
an image processor; and
a projector,
the image processor including
a processor configured to implement at least:
acquiring a first image, and first information indicating a condition of a first projection surface, the first information including a first color gamut of the first projection surface;
deriving a second color gamut based on the first color gamut;
converting a chromaticity of the first image to obtain a second image, each pixel of the second image having a color included in the second color gamut; and
generating a first converted image by correcting the second image based on the first color gamut, wherein
the projector is configured to display the first converted image by projecting the first converted image onto the first projection surface.

14. The image display device according to claim 13, further comprising a camera configured to image the first projection surface.

15. An image processing method, comprising:
acquiring a first image, and first information indicating a condition of a first projection surface, the first information including a first color gamut of the first projection surface;
deriving a second color gamut based on the first color gamut;
converting a chromaticity of the first image to obtain a second image, each pixel of the second image having a color included in the second color gamut; and
generating a first converted image by correcting the second image based on the first color gamut.

* * * * *